US010946534B2

(12) United States Patent
Nagata et al.

(10) Patent No.: US 10,946,534 B2
(45) Date of Patent: Mar. 16, 2021

(54) ROBOT HAND APPARATUS, ROBOT HAND SYSTEM, AND HOLDING METHOD

(71) Applicant: Panasonic Intellectual Property Management Co., Ltd., Osaka (JP)

(72) Inventors: Takayuki Nagata, Osaka (JP); Yasunao Okazaki, Shiga (JP); Katsuhiko Asai, Nara (JP); Kazuo Inoue, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 376 days.

(21) Appl. No.: 16/039,289

(22) Filed: Jul. 18, 2018

(65) Prior Publication Data
US 2019/0030727 A1    Jan. 31, 2019

(30) Foreign Application Priority Data

Jul. 28, 2017  (JP) .............................. JP2017-146689

(51) Int. Cl.
*B25J 15/06* (2006.01)
*B25J 15/00* (2006.01)
(Continued)

(52) U.S. Cl.
CPC ........... *B25J 15/065* (2013.01); *B25J 9/1612* (2013.01); *B25J 9/1697* (2013.01);
(Continued)

(58) Field of Classification Search
CPC .... B25J 15/0441; B25J 15/0691; B25J 9/023; B25J 9/1612; B25J 9/1697; B25J 15/12; B25J 15/0023; B25J 15/0253; B25J 15/065; B25J 15/0616; G05B 2219/39554; G05B 2219/39558; G05B 2219/40032; G05B 2219/40053; G05B 2219/40065
See application file for complete search history.

(56) References Cited

U.S. PATENT DOCUMENTS

| 9,457,477 B1 * | 10/2016 | Rublee ..................... B25J 9/16 |
| 10,035,264 B1 * | 7/2018 | Kalakrishnan ....... G05D 1/0223 |
| 10,195,746 B2 * | 2/2019 | Truebenbach ..... G01R 31/2834 |

FOREIGN PATENT DOCUMENTS

| JP | 2013-248695 | 12/2013 |
| JP | 2014-200874 | 10/2014 |
| JP | 2014200874 | * 10/2014 |

OTHER PUBLICATIONS

Vittor et al. "A Flexible Robotic Gripper for Automation of Assembly Tasks: A technology study on a gripper for operation in shared human environments", Assembly and Manufacturing (ISAM), 2011 IEEE International Symposium on, IEEE, May 25, 2011 (May 25, 2011), pp. 1-6. (Year: 2011).*

* cited by examiner

Primary Examiner — Abby Y Lin
Assistant Examiner — Dylan M Katz
(74) Attorney, Agent, or Firm — Wenderoth, Lind & Ponack, L.L.P.

(57) ABSTRACT

A robot hand apparatus includes a first holder having a first sucking surface that is bendable at any position and configured to suck an object using negative pressure; a second holder arranged to oppose the first sucking surface of the first holder; and a driving mechanism configured to change a distance between the first holder and the second holder to sandwich the object between the first holder and the second holder.

20 Claims, 17 Drawing Sheets

(51) Int. Cl.
   *B25J 15/02* (2006.01)
   *B25J 15/12* (2006.01)
   *B25J 9/16* (2006.01)
(52) U.S. Cl.
   CPC ....... *B25J 15/0023* (2013.01); *B25J 15/0038* (2013.01); *B25J 15/0253* (2013.01); *B25J 15/0616* (2013.01); *B25J 15/12* (2013.01); *G05B 2219/40053* (2013.01)

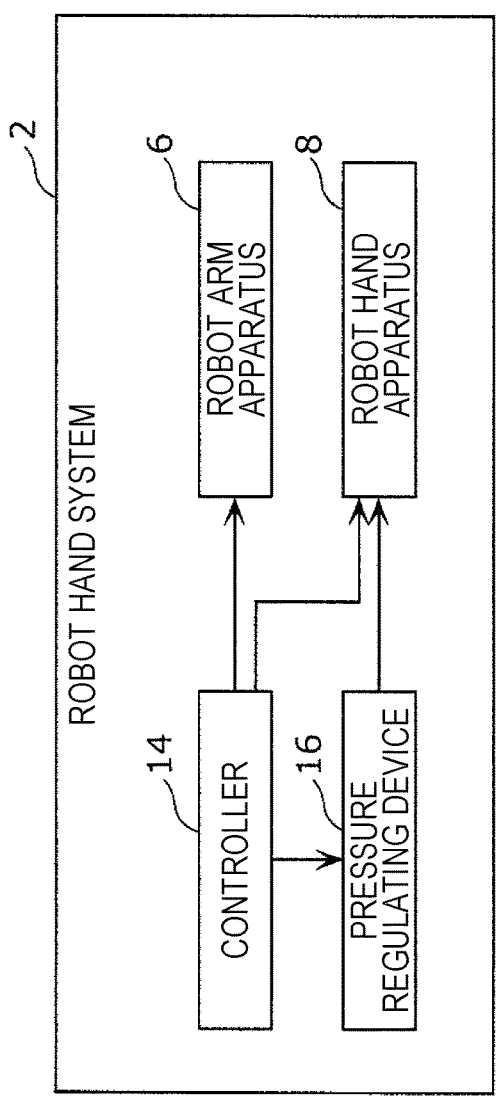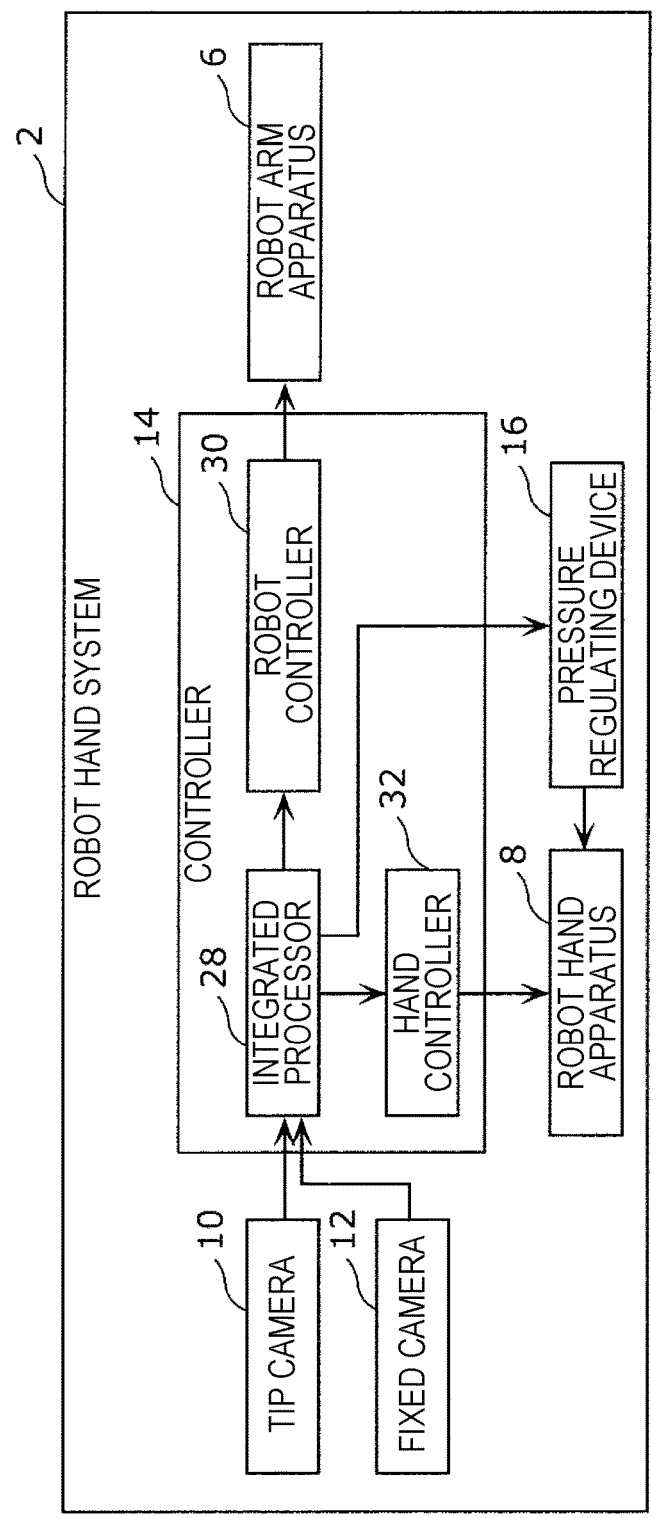
FIG. 2A
FIG. 2B

FIG. 5
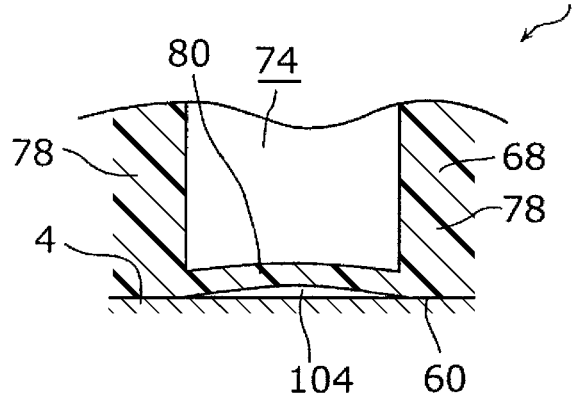
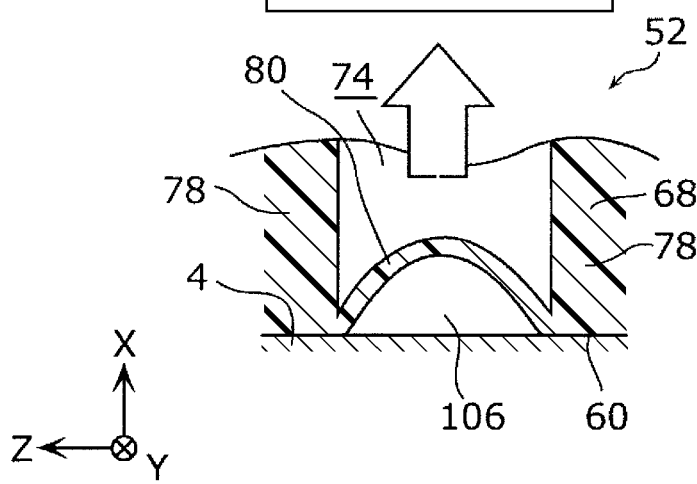

ROBOT HAND APPARATUS, ROBOT HAND SYSTEM, AND HOLDING METHOD

BACKGROUND

1. Technical Field

The present disclosure relates to a robot hand apparatus, a robot hand system, and a holding method.

2. Description of the Related Art

A robot hand apparatus of a type having a function of sucking an object using negative pressure and a function of sandwiching the object is known as one of robot hand apparatuses that hold objects (see, Japanese Patent No. 5957295 and Japanese Unexamined Patent Application Publication No. 2014-200874).

The robot hand apparatus disclosed in Japanese Patent No. 5957295 includes a pair of hands that sandwich an object. The pair of hands each have a sucking surface having sucking pads. An object is sucked to the sucking pads of the hand using negative pressure, and thus the object can be held by only one hand. Moreover, the state can be transitioned from a state in which the object is sucked to and held by one hand to a state in which the object is sandwiched by the pair of hands while the held state is maintained.

The robot hand apparatus disclosed in Japanese Unexamined Patent Application Publication No. 2014-200874 includes a flexible sucking surface having sucking pads. An object is sucked to the sucking pads using negative pressure in a state in which the flexible sucking surface is deformed along the shape of the object, and thus the object can be held by sandwiching and sucking.

SUMMARY

In some cases, an object may be picked up by using the above-described robot hand apparatus from the inside of a storage shelf or the inside of a package box in a warehouse of a store, and the picked up object may be displayed or stored. To pick up the object by sucking using the robot hand apparatus disclosed in Japanese Patent No. 5957295, the pair of hands has to be inserted into the storage shelf or the package box in a state in which the pair of hands expands at 180° or more. To reliably sandwich the object after the object is picked up, the sucking position has to be determined such that rotary sections of the hands are located at an end of the object. Alternatively, to pick up the object by sandwiching from the beginning, the pair of hands has to be inserted into the storage shelf or the package box in a state in which the distance between the pair of hands is increased to a certain distance substantially equal to the width of the object, at the angle by which the object can be sandwiched.

However, in the narrow space like the inside of the storage shelf or the inside of the package box described above, a hand may interfere with the storage shelf or the package box, and thus the sucking position of the robot hand apparatus cannot be freely determined, or the object cannot be picked up because the sucking position of the robot hand apparatus cannot be freely determined or the posture of the robot hand apparatus cannot be freely changed.

Moreover, with the robot hand apparatus disclosed in Japanese Unexamined Patent Application Publication No. 2014-200874, since the sucking surface is flexibly deformed, the posture when the object is held can be freely changed; however, the state cannot be transitioned from the state in which the object is sucked to the state in which the object is sandwiched. Thus, in a case where the object has a flat sucked surface, when work of applying an external force on the object is performed after the object is picked up, the object may be dropped.

One non-limiting and exemplary embodiment provides a robot hand apparatus, a robot hand system, and a method of holding an object each capable of easily picking up a target object even when the object is arranged in a narrow space, and capable of reliably holding the object even when an external force is applied to the object after holding the object.

In one general aspect, the techniques disclosed here feature a robot hand apparatus including a first holder having a first sucking surface that is bendable at any position and that sucks an object using negative pressure, and a second holder arranged to oppose the first sucking surface of the first holder; and a driving mechanism that changes a distance between the first holder and the second holder to sandwich the object between the first holder and the second holder.

It should be noted that the general or specific aspects may be implemented as a system, a method, an integrated circuit, a computer program, a computer-readable storage medium, or any selective combination thereof. The computer-readable storage medium may include a non-volatile storage medium, for example, a compact disc-read only memory (CD-ROM).

With the robot hand apparatus or the like according to one aspect of the present disclosure, a target object can be easily picked up even when the object is arranged in a narrow space, and the object can be reliably held even when an external force is applied to the object after holding the object. Additional benefits and advantages according to one aspect of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2A is a block diagram illustrating a major functional configuration of the robot hand system according to the first embodiment;

FIG. 2B is a block diagram illustrating a specific functional configuration of the robot hand system according to the first embodiment;

FIG. 5 illustrates cross-sectional views in an enlarged manner of a first thin portion of the robot hand apparatus according to the first embodiment;

DETAILED DESCRIPTION

Figure 1:
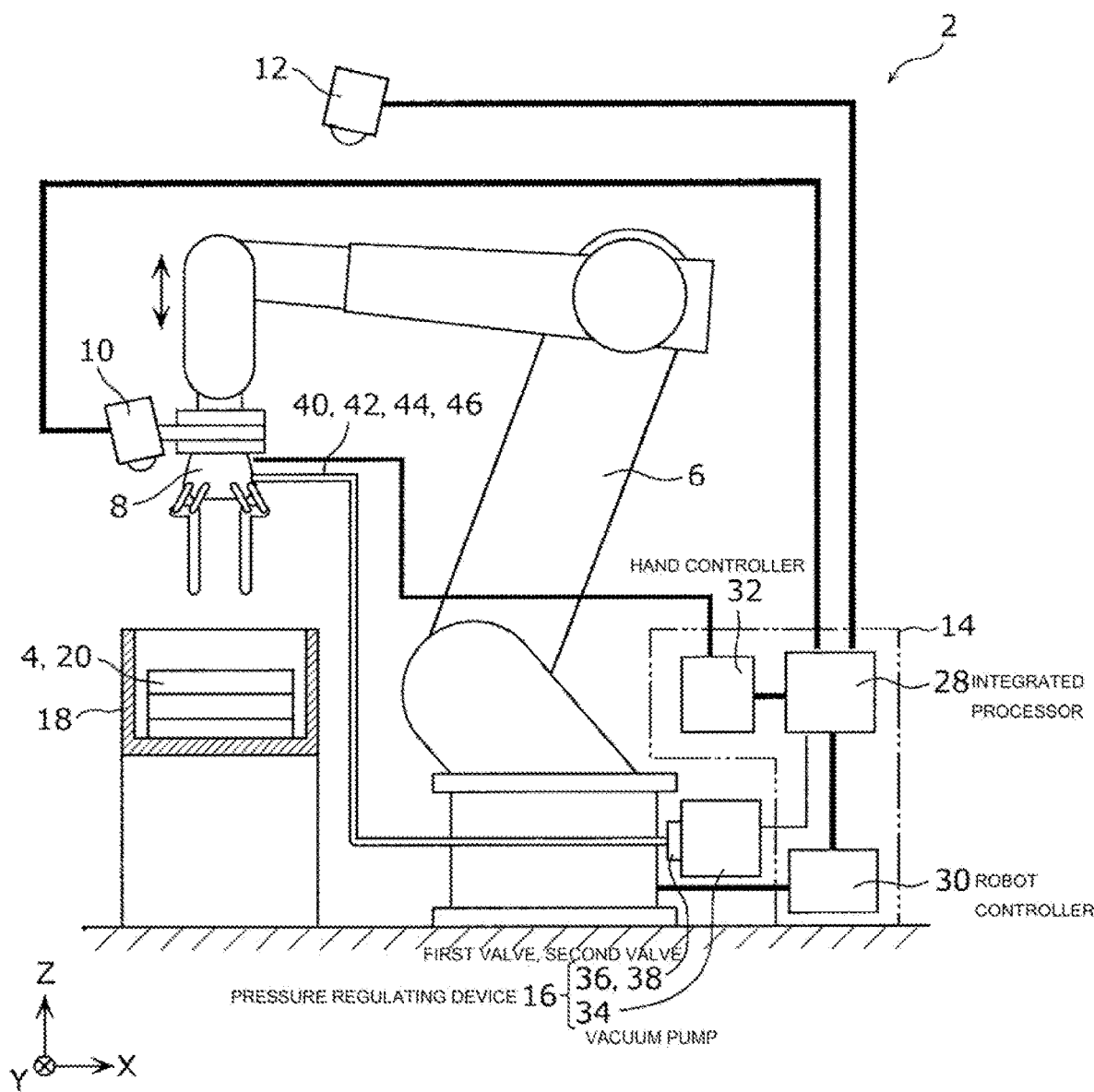
FIG. 1 illustrates a configuration of a robot hand system according to a first embodiment.

According to an aspect of the present disclosure, a robot hand apparatus includes a first holder having a first sucking surface that is bendable at any position and that sucks an object using negative pressure, and a second holder arranged to oppose the first sucking surface of the first holder; and a driving mechanism that changes a distance between the first holder and the second holder to sandwich the object between the first holder and the second holder.

With the aspect, the object can be sucked to the first sucking surface using negative pressure and picked up in the state in which the first sucking surface is bent at any position. Thus, for example, even when the object is arranged in a narrow space, such as the inside of a storage shelf or the inside of a package box, the object can be easily picked up by appropriately bending the first sucking surface in accordance with the size or shape of the space, while the robot hand apparatus is prevented from interfering with the storage shelf or the package box. Furthermore, since the distance between the first holder and the second holder is decreased by the driving mechanism in the state in which the object is sucked to the first sucking surface, the object can be sandwiched between the first holder and the second holder. Thus, for example, the object can be conveyed while the object is reliably held. Also, the object can be reliably held even when an external force is applied to the object after the object is held.

For example, the second holder may have a second sucking surface that is bendable at any position and that sucks the object using negative pressure; and the first holder and the second holder may be arranged such that the first sucking surface opposes the second sucking surface.

With the aspect, the object can be sucked to the first sucking surface and the second sucking surface using negative pressure while the object is sandwiched between the first holder and the second holder. Thus, the object can be further reliably held.

For example, a first space may be formed in the first holder; a second space may be formed in the second holder; the first sucking surface may have a first thick portion and a first thin portion that is thinner than the first thick portion; the second sucking surface may have a second thick portion and a second thin portion that is thinner than the second thick portion; when a pressure of the first space is reduced to be lower than an atmospheric pressure, the first thin portion may be deformed to protrude toward the first space and suck the object using negative pressure; and when a pressure of the second space is reduced to be lower than the atmospheric pressure, the second thin portion may be deformed to protrude toward the second space and suck the object using negative pressure.

With the aspect, since the first sucking surface and the second sucking surface are closed, even when either of the first sucking surface and the second sucking surface has a region with poor adhesion to the object, high sucking force can be maintained. In general, a sucking hole of a type that sucks air through the sucking hole may be clogged. However, with the aspect, since the sucking portions of the first sucking surface and the second sucking surface are respectively closed with the first thin portions and the second thin portions, the sucking hole can be prevented from being clogged.

For example, the first sucking surface may have a first sucking hole through which air is sucked; the second sucking surface may have a second sucking hole through which air is sucked; when air is sucked through the first sucking hole, the first sucking surface may suck the object using negative pressure; and when air is sucked through the second sucking hole, the second sucking surface sucks the object using negative pressure.

With the aspect, the object can be sucked to the first holder and the second holder using negative pressure with the simple configuration.

For example, the first holder may have a first bag that can contract when a pressure in the first bag is reduced to be lower than the atmospheric pressure, and first particles filled in the first bag; and the second holder may have a second bag that can contract when a pressure in the second bag is reduced to be lower than the atmospheric pressure, and second particles filled in the second bag.

With the aspect, the first bag contracts when the pressure in the first bag is reduced to be lower than the atmospheric pressure. Hence, restriction on the movement of the first particles in the first bag, or what is called jamming transition phenomenon occurs, and the first holder can be hardened. Similarly, the second bag contracts when the pressure in the second bag is reduced to be lower than the atmospheric pressure, and the second holder can be hardened. By hardening the first holder and the second holder in this way, the object can be further reliably sandwiched between the first holder and the second holder.

According to another aspect of the present disclosure, a robot hand system includes any one of the aforementioned robot hand apparatuses; a robot arm apparatus that supports the robot hand apparatus and that changes a position or a posture of the robot hand apparatus; a pressure regulating device that sucks air from the first holder or the second holder of the robot hand apparatus; and a controller that controls the robot hand apparatus, the robot arm apparatus, and the pressure regulating device so that the robot hand apparatus holds the object.

With the aspect, the object can be sucked to the first sucking surface using negative pressure and picked up in the state in which the first sucking surface is bent at any position. Thus, for example, even when the object is arranged in a narrow space, such as the inside of a storage shelf or the inside of a package box, the object can be easily picked up by appropriately bending the first sucking surface in accordance with the size or shape of the space, while the robot hand apparatus is prevented from interfering with the storage shelf or the package box. Furthermore, since the distance between the first holder and the second holder is decreased by the driving mechanism in the state in which the object is sucked to the first sucking surface, the object can be sandwiched between the first holder and the second holder. Thus, for example, the object can be conveyed while the object is reliably held. Also, the object can be reliably held even when an external force is applied to the object after the object is held.

For example, the robot hand system may further include an imaging device that image captures the object, in which the controller may judge a sucked region that can be sucked of a sucked surface of the object on the basis of a result of the image capture by the imaging device, and thus determine a sucking position of the first holder.

With the aspect, since the bent position of the first sucking surface and the sucking position of the first holder are determined in accordance with the judged sucked region, the object can be further reliably held.

According to still another aspect of the present disclosure, a holding method using a robot hand apparatus is provided. The robot hand apparatus includes a first holder having a first sucking surface that is bendable at any position and that sucks an object using negative pressure, a second holder arranged to oppose the first sucking surface of the first holder, and a driving mechanism that changes a distance between the first holder and the second holder. The method includes touching a distal end of the first holder on the object; pressing the distal end of the first holder to the object, and thus bending the first sucking surface at a first position; causing a region of the first sucking surface between the first position and the distal end of the first holder to suck the object; extending the first sucking surface bent at the first position in a state in which the first sucking surface sucks the object; and decreasing the distance between the first holder and the second holder, and thus sandwiching the object between the first holder and the second holder.

With the aspect, the object can be sucked to the first sucking surface using negative pressure and picked up in the state in which the first sucking surface is bent at any position. Thus, for example, even when the object is arranged in a narrow space, such as the inside of a storage shelf or the inside of a package box, the object can be easily picked up by appropriately bending the first sucking surface in accordance with the size or shape of the space, while the robot hand apparatus is prevented from interfering with the storage shelf or the package box. Furthermore, since the distance between the first holder and the second holder is decreased by the driving mechanism in the state in which the first sucking surface sucks the object, the object can be sandwiched between the first holder and the second holder. Thus, for example, the object can be conveyed while the object is reliably held. Also, the object can be reliably held even when an external force is applied to the object after the object is held.

For example, hardness of the first holder and hardness of the second holder may be changeable; and when the object is sandwiched, the object may be sandwiched between the first holder and the second holder, in a state in which the first holder and the second holder are hardened.

With the aspect, by hardening the first holder and the second holder, the object can be further reliably sandwiched between the first holder and the second holder.

For example, the second holder may have a second sucking surface that sucks the object using negative pressure; the first holder and the second holder may be arranged such that the first sucking surface opposes the second sucking surface; and the holding method may further include causing the second sucking surface to suck the object after the object is sandwiched.

With the aspect, since the object can be sucked to the first sucking surface and the second sucking surface using negative pressure while the object is sandwiched between the first holder and the second holder, the object can be further reliably held.

For example, when the region is caused to suck the object, the region of the first sucking surface may be caused to suck an upper surface of the object; and when the first sucking surface is extended, the first sucking surface bent at the first position may be extended while the object is vertically inverted.

With the aspect, the operation of vertically inverting the orientation of the object, and the operation of picking up the object can be simultaneously performed.

For example, the holding method may further include image capturing the object using an imaging device; judging a sucked region that is included in a sucked surface of the object and that can be sucked to the first sucking surface on the basis of a result of the image capture by the imaging device; and determining a sacking position of the first holder on the basis of a size of the sucked region.

With the aspect, since the bent position of the first sucking surface and the sucking position of the first holder are determined in accordance with the judged sucked region, the object can be further reliably held.

According to yet another aspect of the present disclosure, a holding method using a robot hand apparatus is provided. The robot hand apparatus includes a first holder having a first sucking surface that is bendable at any position and that sucks an object using negative pressure, a second holder having a second sucking surface that is bendable at any position and that sucks the object using negative pressure, and a driving mechanism that changes a distance between the first holder and the second holder, the first holder and the second holder being arranged such that the first sucking surface opposes the second sucking surface. The method includes touching a distal end of the first holder on a first side surface of an object, and touching a distal end of the second holder on a second side surface that is non-parallel to the first side surface of the object; decreasing the distance between the first holder and the second holder, and thus bending the first sucking surface at a first position and bending the second sucking surface at a second position; causing a region of the first sucking surface between the first position and the distal end of the first holder to suck the first side surface of the object, and causing a region of the second sucking surface between the second position and the distal end of the second holder to suck the second side surface of the object; releasing the sucking of the second sucking surface to the second side surface of the object; and extending the first sucking surface bent at the first position and the second sucking surface bent at the second position while the distance between the first holder and the second holder is increased in a state in which the first sucking surface sucks the first side surface of the object.

With the aspect, for example, even when the object is arranged in a narrow space such as the inside of the storage shelf or the inside of the package box, the first sucking surface and the second sucking surface can be appropriately bent in accordance with the size and shape of the space. Thus, the orientation of the object can be corrected and the object can be held while the robot hand apparatus is prevented from interfering with the storage shelf or the package box.

For example, the holding method may further include touching the distal end of the first holder on the first side surface of the object, and touching the distal end of the second holder on a third side surface that is non-parallel to the second side surface of the object; causing the second sucking surface to suck the third side surface; decreasing the distance between the first holder and the second holder in a state in which the second sucking surface sucks the third side surface of the object, and thus bending the first sucking surface at a third position and bending the second sucking surface at a fourth position; causing a region of the first sucking surface between the third position and the distal end of the first holder to suck the second side surface of the object; releasing the sucking of the second sucking surface to the third side surface of the object; and extending the first sucking surface bent at the third position and the second sucking surface bent at the fourth position while the distance between the first holder and the second holder is increased in a state in which the first sucking surface sucks the second side surface of the object.

With the aspect, the orientation of the object can be changed after the object is sandwiched between the first holder and the second holder.

It should be noted that the general or specific aspects may be implemented as a system, a method, an integrated circuit, a computer program, a computer-readable storage medium such as a CD-ROM, or any selective combination thereof.

Embodiments are specifically described below with reference to the drawings.

The embodiments to be described below each represent a general or specific example. The numerals, shapes, materials, components, arrangement positions and connection forms of the components, steps, the order of the steps described in the embodiments are merely examples and do not intend to limit the present disclosure. Among the components in the following embodiments, a component not described in the independent claim indicating the most general concept is described as an optional component.

First Embodiment 1-1. Configuration of Robot Hand System

Figure 3:
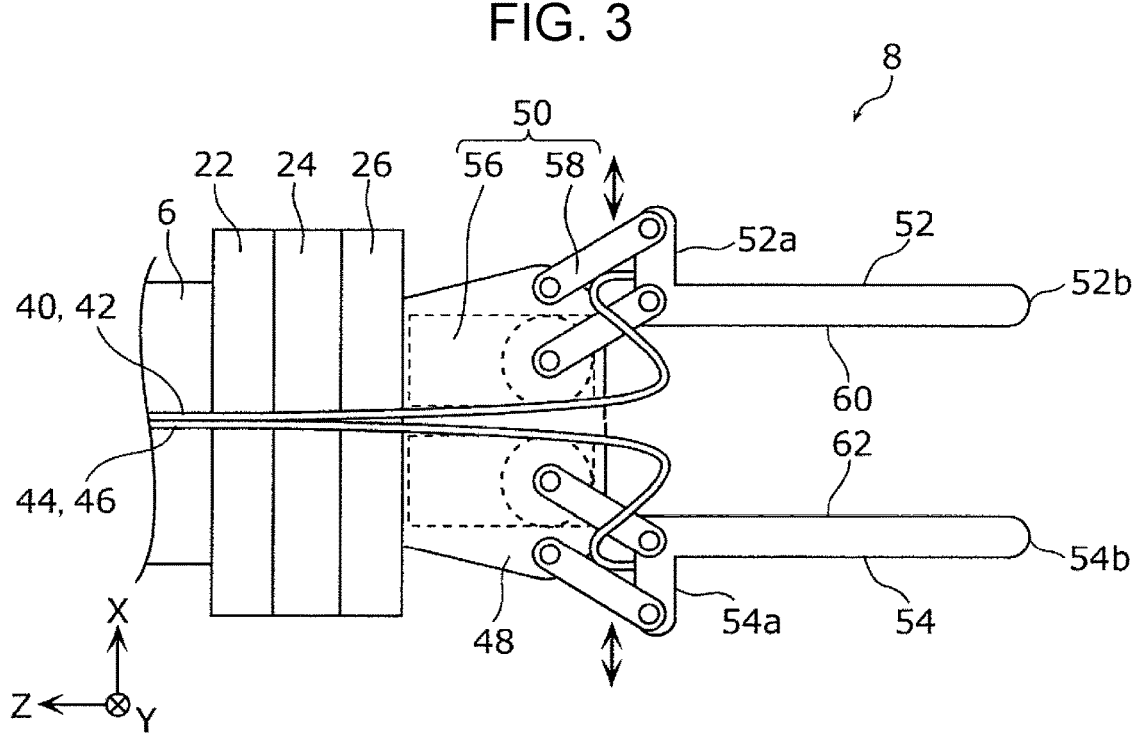
FIG. 3 illustrates a robot hand apparatus in an enlarged manner according to the first embodiment.

A configuration of a robot hand system 2 according to a first embodiment is described first with reference to FIGS. 1 to 3. FIG. 1 illustrates the configuration of the robot hand system 2 according to the first embodiment. FIG. 2A is a block diagram illustrating a major functional configuration of the robot hand system 2 according to the first embodiment. FIG. 2B is a block diagram illustrating a specific functional configuration of the robot hand system 2 according to the first embodiment. FIG. 3 illustrates a robot hand apparatus 8 in an enlarged manner according to the first embodiment.

The robot hand system 2 according to the first embodiment is a system that picks up and conveys an object 4. As illustrated in FIGS. 1, 2A, and 2B, the robot hand system 2 includes a robot arm apparatus 6, the robot hand apparatus 8, a tip camera 10, a fixed camera 12, a controller 14, and a pressure regulating device 16.

The object 4 is, for example, a plate-like product having any of various shapes and sizes. As illustrated in FIG. 1, products 20 are stored in a package box 18 arranged in, for example, a warehouse of a store, in a stacked manner in the up-down direction (Z-axis direction). The object 4 is a product 20 which is a target to be picked up by the robot hand system 2 from among the products 20, and is, for example, a product 20 which is arranged on the top.

The robot arm apparatus 6 is formed of, for example, an articulated coordinate robot. The robot arm apparatus 6 changes the position or posture of the robot hand apparatus 8 with six degrees of freedom in a predetermined working area. As illustrated in FIG. 3, a hand mount 22 and a camera mount 24 are arranged at a distal end of the robot arm apparatus 6. Note that the robot arm apparatus 6 is not limited to the articulated coordinate robot, and may be formed of another type of robot.

As illustrated in FIGS. 1 and 3, the robot hand apparatus 8 is mounted to the distal end (the hand mount 22 and the camera mount 24) of the robot arm apparatus 6 via a mounting flange 26. The robot hand apparatus 8 picks up the object 4 from the package box 18 while sucking the object 4 using negative pressure, and then sandwiches the object 4. Thus, the robot hand apparatus 8 can hold the target object 4 from among the products 20. The configuration of the robot hand apparatus 8 is described later in detail.

As illustrated in FIGS. 1 and 3, the tip camera 10 is mounted to the camera mount 24 of the robot arm apparatus 6. The tip camera 10 image captures the object 4 existing in front of the robot hand apparatus 8. Note that FIG. 3 does not illustrate the tip camera 10 for the convenience of the description.

The fixed camera 12 is fixed to, for example, a ceiling of a room where the robot hand system 2 is installed. The fixed camera 12 image captures the robot hand apparatus 8, the object 4 existing in front of the robot hand apparatus 8, and a conveyance destination (for example, storage shelf) of the object 4.

As illustrated in FIGS. 1 and 2B, the controller 14 has an integrated processor 28, a robot controller 30, and a hand controller 32. The integrated processor 28 a) transmits an operation command signal to the robot controller 30, b) transmits a driving signal to the hand controller 32, and c) transmits a control signal to the pressure regulating device 16 on the basis of image information from the tip camera 10 and the fixed camera 12 and sensor information from various sensors (not illustrated). The robot controller 30 controls the operation of the robot arm apparatus 6 on the basis of the operation command signal from the integrated processor 28. The hand controller 32 controls the driving of a driving mechanism 50 (described later) of the robot hand apparatus 8 on the basis of the driving signal from the integrated processor 28.

The pressure regulating device 16 has a vacuum pump 34, a first valve 36, and a second valve 38. As illustrated in FIGS. 1 and 3, the vacuum pump 34 communicates with a first space 74 and a first bag 70 of a first holder 52 (see FIG. 4 described later) of the robot hand apparatus 8 via a first tube 40 and a second tube 42. The vacuum pump 34 also communicates with a second space 94 and a second bag 90 of a second holder 54 (see FIG. 4 described later) of the robot hand apparatus 8 via a third tube 44 and a fourth tube 46.

The vacuum pump 34 a) sucks air from the first space 74 of the first holder 52 via the first tube 40, b) sucks air from the first bag 70 of the first holder 52 via the second tube 42, c) sucks air from the second space 94 of the second holder 54 via the third tube 44, and d) sucks air from the second bag 90 of the second holder 54 via the fourth tube 46, on the basis of the control signal from the integrated processor 28.

The first valve 36 is an on-off valve that opens the first space 74 and the first bag 70 of the first holder 52, and the second space 94 and the second bag 90 of the second holder 54 individually to the atmosphere, and is arranged at, for example, the vacuum pump 34. The first valve 36 is opened and closed on the basis of the control signal from the integrated processor 28. Since air is sucked by the vacuum pump 34 in the state in which the first valve 36 is closed, the pressures of the first space 74 and the first bag 70 of the first holder 52, and the pressures of the second space 94 and the second bag 90 of the second holder 54 are individually decreased to be lower than the atmospheric pressure. Then, when the first valve 36 is opened, the pressures of the first space 74 and the first bag 70 of the first holder 52, and the pressures of the second space 94 and the second bag 90 of the second holder 54 are individually restored to the atmospheric pressure.

The second valve 38 is a switching valve that desirably switches the connection target of the vacuum pump 34 among the first tube 40, the second tube 42, the third tube 44, and the fourth tube 46, on the basis of the control signal from the integrated processor 28. For example, when the connection target of the vacuum pump 34 is switched to the first tube 40 and/or the third tube 44, the object 4 can be sucked to the first holder 52 and/or the second holder 54. For example, when the connection target of the vacuum pump 34 is switched to the second tube 42 and/or the fourth tube 46, the first holder 52 and/or the second holder 54 can be hardened. The configurations relating to sucking and hardening will be described later.

While one vacuum pump 34 is provided in this embodiment, it is not limited thereto. A vacuum pump that causes the first holder 52 and the second holder 54 to suck the object 4, and a vacuum pump that hardens the first holder 52 and the second holder 54 may be individually provided.

1-2. Configuration of Robot Hand Apparatus

Figure 4:
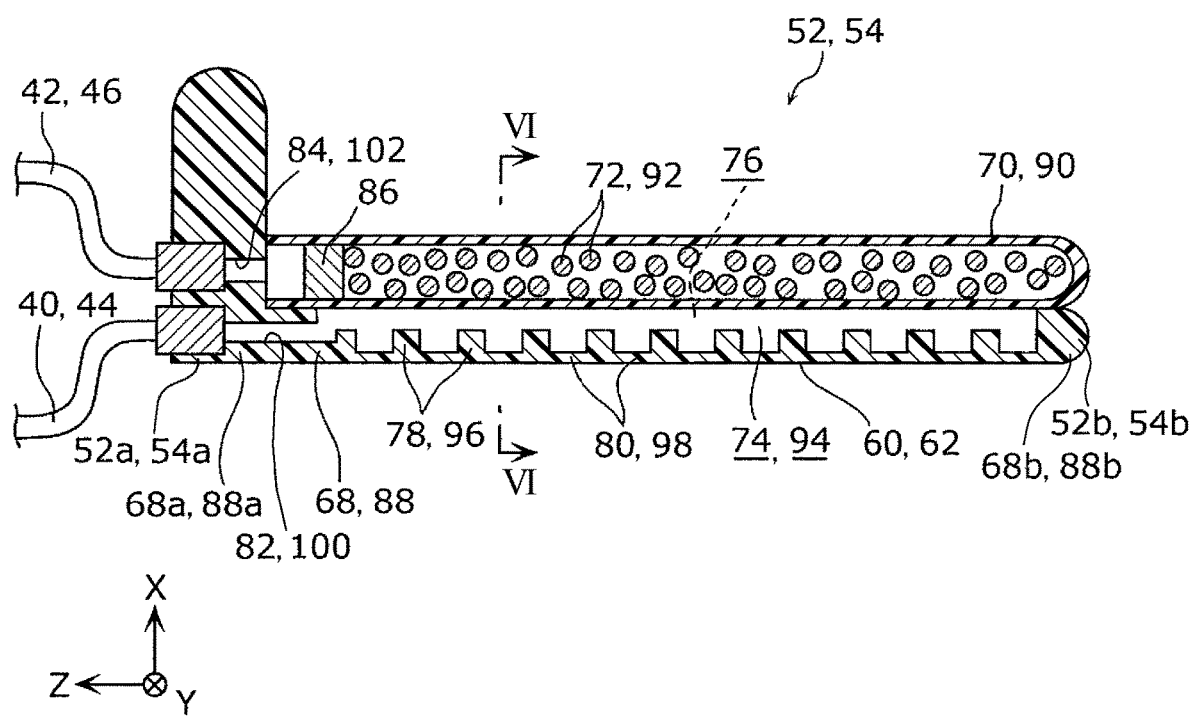
FIG. 4 is a cross-sectional view illustrating a first holder (second holder) of the robot hand apparatus according to the first embodiment.
Figure 6:
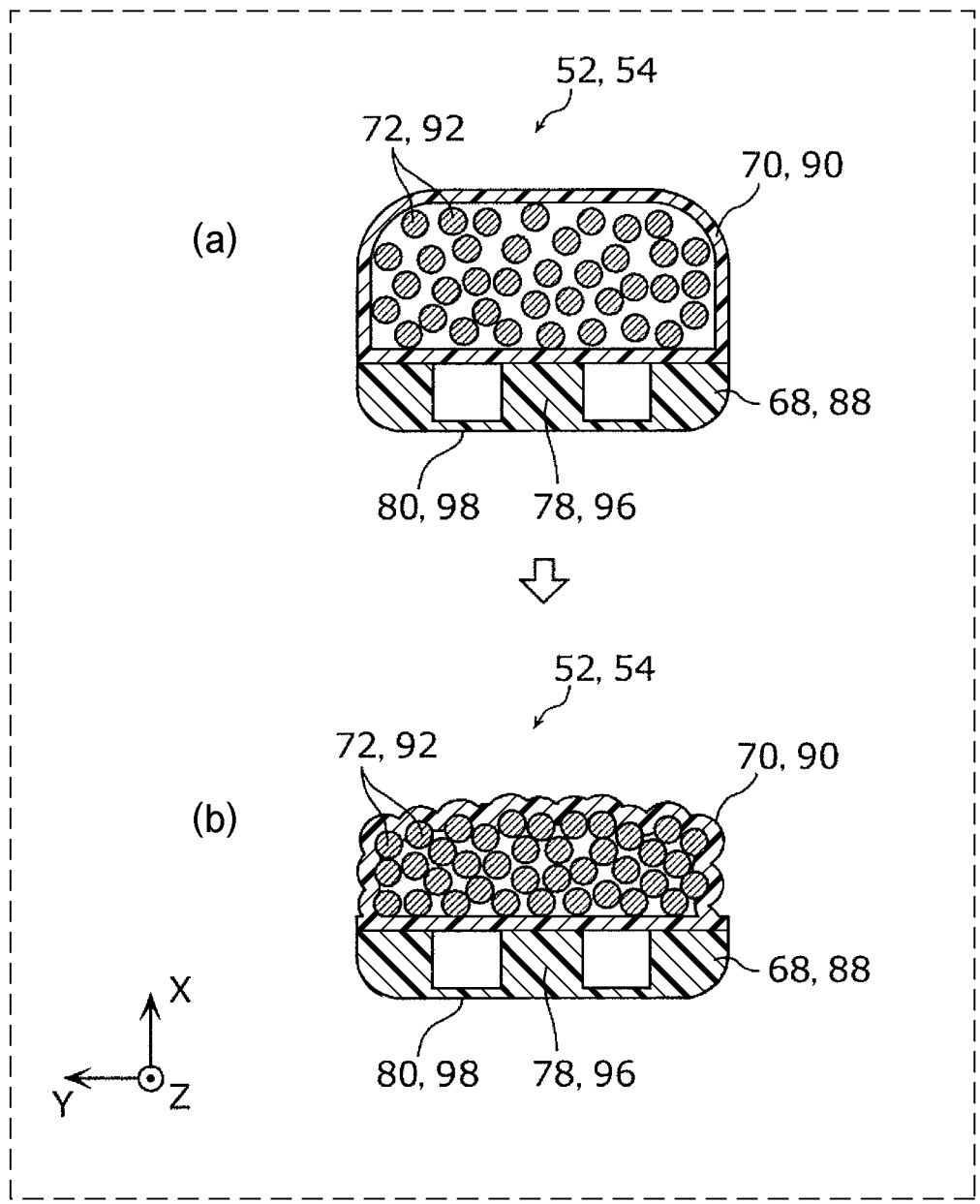
FIG. 6 illustrates cross-sectional views of the first holder (second holder) of the robot hand apparatus according to the first embodiment taken along line VI-VI of FIG. 4.

A configuration of the robot hand apparatus 8 according to the first embodiment is described next with reference to FIGS. 3 to 6. FIG. 4 is a cross-sectional view illustrating the first holder 52 (second holder 54) of the robot hand apparatus 8 according to the first embodiment. FIG. 5 illustrates cross-sectional views in an enlarged manner of a first thin portion 80 of the robot hand apparatus 8 according to the first embodiment. FIG. 6 illustrates cross-sectional views of the first holder 52 (second holder 54) of the robot hand apparatus 8 according to the first embodiment taken along line VI-VI of FIG. 4.

As illustrated in FIG. 3, the robot hand apparatus 8 includes a hand supporter 48, the driving mechanism 50, the first holder 52, and the second holder 54.

The hand supporter 48 is a member that supports the first holder 52 and the second holder 54. The hand supporter 48 is mounted to the distal end (the hand mount 22 and the camera mount 24) of the robot arm apparatus 6 via the mounting flange 26.

The driving mechanism 50 is a mechanism that changes the distance between the first holder 52 and the second holder 54, and is supported by the hand supporter 48. The driving mechanism 50 has a rotary actuator 56 and a parallel linkage 58. The rotary actuator 56 is controlled by the hand controller 32 to drive the parallel linkage 58. When the parallel linkage 58 is driven by the rotary actuator 56, the parallel linkage 58 translate the first holder 52 and the second holder 54 in a direction (X-axis direction) toward or away from each other. Thus, the distance between the first holder 52 and the second holder 54 can be decreased or increased.

As illustrated in FIG. 3, the first holder 52 and the second holder 54 are flexible fingers that suck the object 4 using negative pressure and sandwich the object 4. The first holder 52 extends long from a proximal end 52a to a distal end 52b. Similarly, the second holder 54 extends long from a proximal end 54a to a distal end 54b. The proximal end 52a of the first holder 52 and the proximal end 54a of the second holder 54 are supported by the hand supporter 48 via the parallel linkages 58.

As illustrated in FIGS. 3 and 4, the first holder 52 and the second holder 54 respectively have a first sucking surface 60 and a second sucking surface 62 that suck the object 4 using negative pressure. The first holder 52 and the second holder 54 are arranged such that the first sucking surface 60 opposes the second sucking surface 62.

As illustrated in FIG. 4, the first holder 52 has a first elastic member 68, the first bag 70, and first particles 72.

The first elastic member 68 is formed of an elastic soft resin, for example, an elastomer such as silicone rubber. The first elastic member 68 is a member serving as a base of the first holder 52. The first elastic member 68 extends long from a proximal end 68a to a distal end 68b. The first space 74 which extends in the longitudinal direction (Z-axis direction) of the first elastic member 68 is formed in the first elastic member 68. An opening 76 that communicates with the first space 74 is formed at a side surface of the first elastic member 68.

Also, the first sucking surface 60 is formed at a side surface of the first elastic member 68 on the side opposite to the opening 76. The first sucking surface 60 is bendable in a mountain fold manner at any position in the longitudinal direction of the first elastic member 68. The first sucking surface 60 has first thick portions 78 and first thin portions 80 having a thickness (a size in the X-axis direction) smaller than the thickness of the first thick portions 78. That is, the first sucking surface 60 has a structure that is closed in the entire region. The first thin portions 80 are, for example, circular in plan view.

The proximal end 68a of the first elastic member 68 is supported by the hand supporter 48 via the parallel linkage 58. A connection hole 82 through which the first space 74 communicates with the outside, and a connection hole 84 through which the inside and outside of the first bag 70 communicate with each other are formed at the proximal end 68a of the first elastic member 68. Ends of the first tube 40 and the second tube 42 are respectively connected to the connection holes 82 and 84.

The first bag 70 is formed in a long bag shape, and is arranged in the longitudinal direction of the first elastic member 68. The first bag 70 is formed of an elastic soft resin, for example, an elastomer such as silicone rubber. The first bag 70 is arranged to seal the opening 76 of the first elastic member 68. Thus, the first space 74 is formed in a region surrounded by the first elastic member 68 and the first bag 70. A proximal end of the first bag 70 in the longitudinal direction (Z-axis direction) is open, and is connected to the connection hole 84 of the first elastic member 68.

A filter 86 is arranged in the first bag 70. The filter 86 is formed of, for example, a breathable sponge. The filter 86 is arranged to cover the connection hole 84. This arrangement can prevent the first particles 72 from entering the connection hole 84.

The first particles 72 are filled in the first bag 70. The first particles 72 are formed of, for example, particulate substances, such as glass beads, beads foam, or calcium carbonate. Alternatively, the first particles 72 may be formed of sponge, rubber chips, or sawdust, instead of the particulate substances.

As illustrated in FIG. 4, the second holder 54 has a second elastic member 88, the second bag 90, and second particles 92, similarly to the first holder 52.

The second elastic member 88 is configured similarly to the first elastic member 68. That is, the second elastic member 88 extends long from a proximal end 88a to a distal end 88b. The second space 94 which extends in the longitudinal direction (Z-axis direction) of the second elastic member 88 is formed in the second elastic member 88. The second sucking surface 62 is formed at a side surface of the second elastic member 88. The second sucking surface 62 is bendable in a mountain fold manner at any position in the longitudinal direction of the second elastic member 88. The second sucking surface 62 has second thick portions 96 and second thin portions 98 having a thickness (a size in the X-axis direction) smaller than the thickness of the second thick portions 96. That is, the second sucking surface 62 has a structure that is closed in the entire region. The second thin portions 98 are, for example, circular in plan view.

The proximal end 88a of the second elastic member 88 is supported by the hand supporter 48 via the parallel linkage 58. A connection hole 100 through which the second space 94 communicates with the outside, and a connection hole 102 through which the inside and outside of the second bag 90 communicate with each other are formed at the proximal end 88a of the second elastic member 88. Ends of the third tube 44 and the fourth tube 46 are respectively connected to the connection holes 100 and 102.

The second bag 90 is configured similarly to the first bag 70. That is, the second bag 90 is formed in a long bag shape, and is arranged in the longitudinal direction of the second elastic member 88. A proximal end of the second bag 90 in the longitudinal direction (Z-axis direction) is open, and is connected to the connection hole 102 of the second elastic member 88. The second particles 92 are arranged in the second bag 90.

The principle of causing the first sucking surface 60 of the first holder 52 to suck the object 4 is described below with reference to FIG. 5.

In the state illustrated in FIG. 5(a), the first sucking surface 60 touches the object 4, and the pressure of the first space 74 of the first holder 52 is set to the atmospheric pressure by the pressure regulating device 16. In this case, a slight space 104 is formed between the first thin portion 80 and the object 4.

In the state illustrated in FIG. 5(b), the pressure of the first space 74 of the first holder 52 is reduced to be lower than the atmospheric pressure by the pressure regulating device 16. In this case, the first thin portion 80 is deformed to protrude toward the first space 74, and hence a space 106 larger than the space 104 is formed between the first thin portion 80 and the object 4. When the volume of the space is increased in this way, the pressure in the space 106 is reduced according to Boyle-Charles' law, and the object 4 can be sucked using negative pressure. Note that, since the first thin portion 80 has the elastic restoring force, when P1 is the pressure of the first space 74, P2 is the pressure of the space 106, and P3 is the pressure of the first thin portion 80, the relation P1=P2+P3 is established and the pressures are in balance. Also, when S is the area of the space 106, the sucking force F is S×P2.

The principle of causing the second sucking surface 62 of the second holder 54 to suck the object 4 is similar to the above-described principle and hence its description is omitted.

The principle of hardening the first holder 52 is described below with reference to FIG. 6. As illustrated in FIG. 6(a), when the pressure in the first bag 70 of the first holder 52 is the atmospheric pressure, a space in which the first particles 72 move is present in the first bag 70, and hence the first particles 72 can freely move in the first bag 70. Thus, the first holder 52 can be deformed in any shape.

In contrast, as illustrated in FIG. 6(b), when the pressure in the first bag 70 of the first holder 52 is reduced to be lower than the atmospheric pressure by the pressure regulating device 16, the first bag 70 contracts. Thus, the volume of the inside of the first bag 70 is reduced, and the volume ratio of the first particles 72 to the inside of the first bag 70 is increased. This reduces the space in which the first particles 72 move in the first bag 70, the degree of adhesion between the first particles 72 is increased, and the frictional force generated between the first particles 72 is increased. Hence, restriction on the movement of the first particles 72 in the first bag 70, or what is called jamming transition phenomenon occurs. Thus, the first holder 52 is hardened, and the shape of the first holder 52 is fixed in the shape at the time at which the pressure in the first bag 70 is reduced to be lower than the atmospheric pressure (for example, a shape extending straight).

The principle of hardening the second holder 54 is similar to the above-described principle and hence its description is omitted.

1-3. Operation of Robot Hand System 1-3-1. Operation of Picking Up Object

Figure 7:
FIG. 7 is a flowchart showing a flow of operation of picking up an object by the robot hand system according to the first embodiment.
Figure 8:
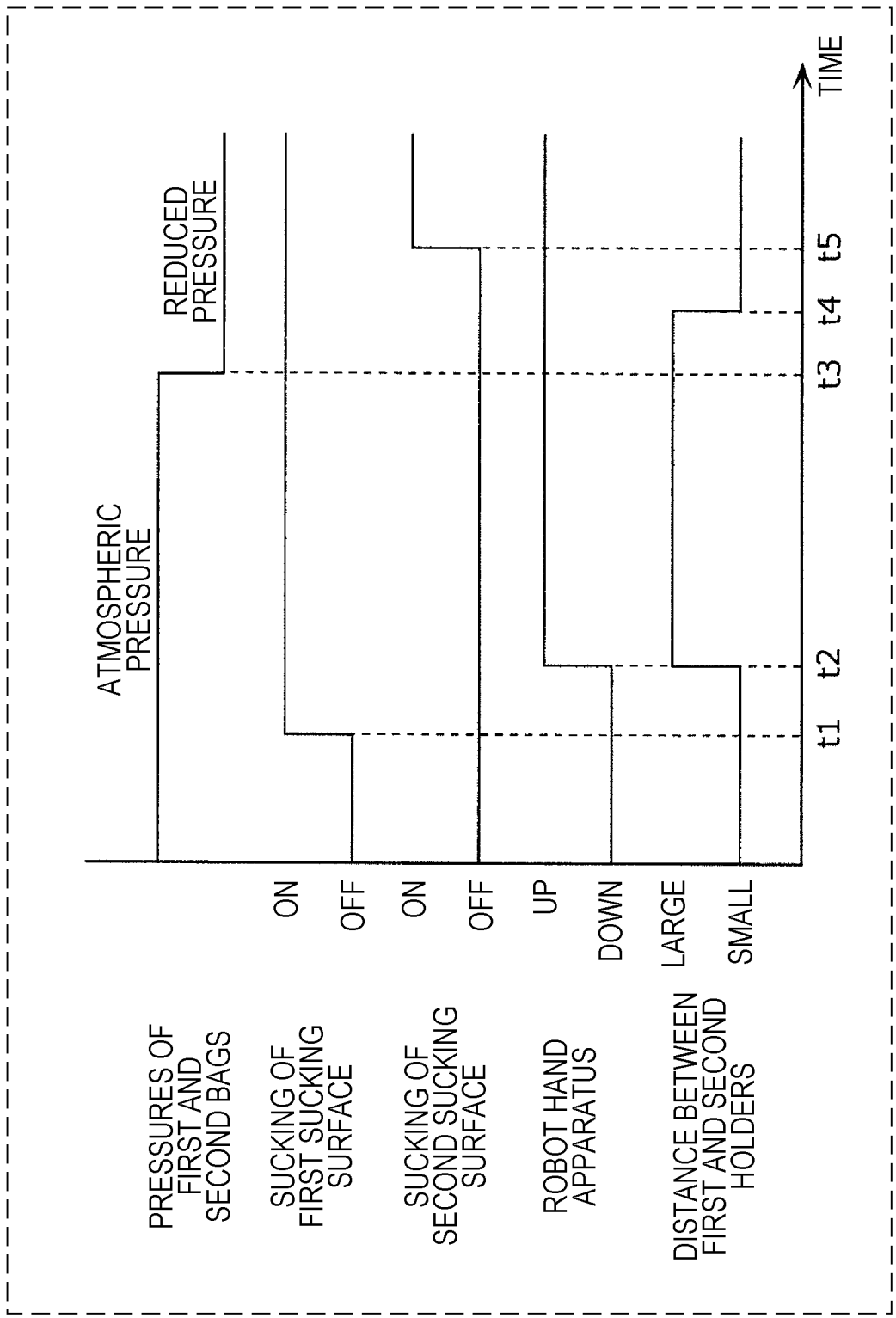
FIG. 8 is a timing chart showing the flow of the operation of picking up the object by the robot hand system according to the first embodiment.
Figure 9:
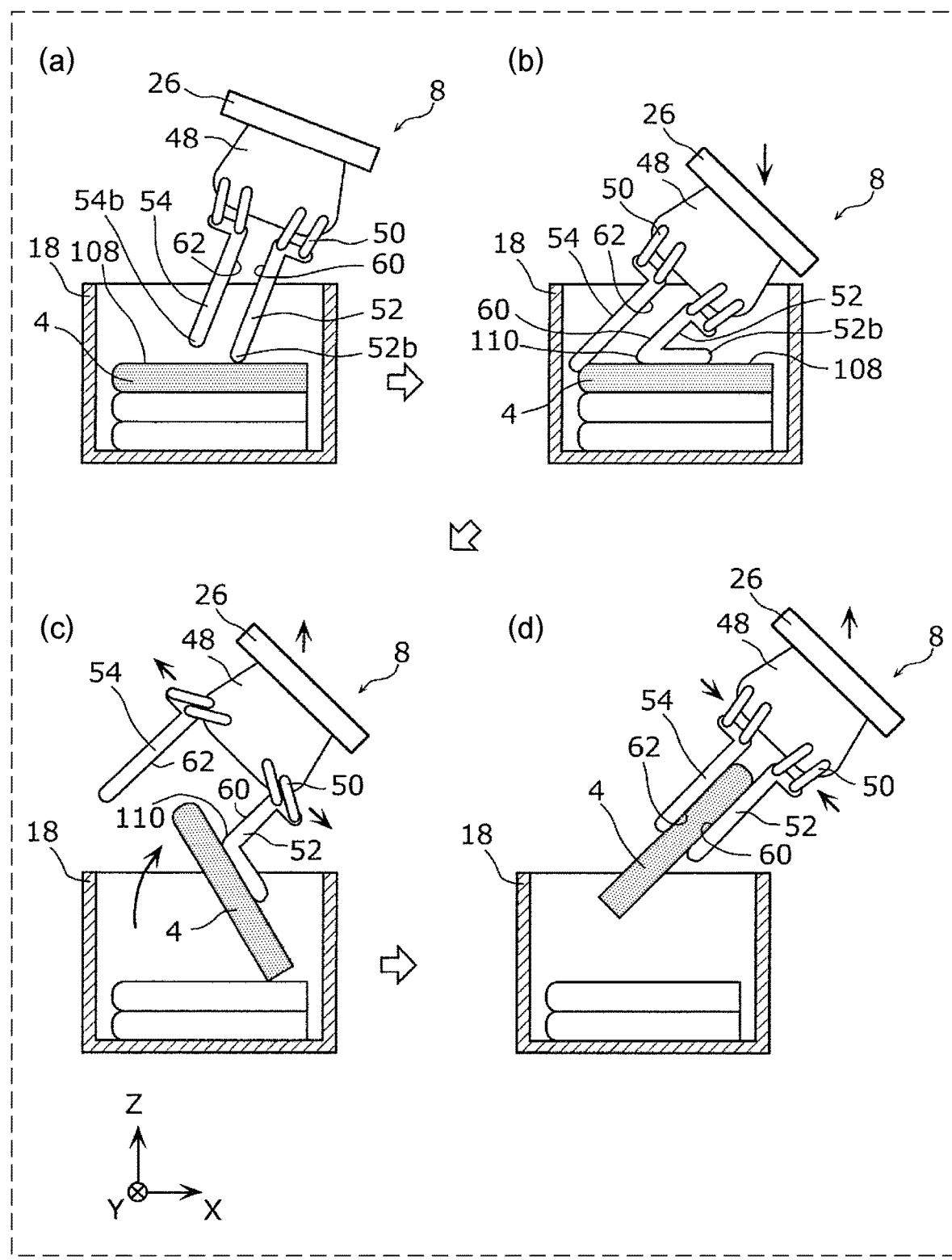
FIG. 9 illustrates the flow of the operation of picking up the object by the robot hand system according to the first embodiment.

Operation of picking up the object 4 by the robot hand system 2 according to the first embodiment is described next with reference to FIGS. 7 to 9. FIG. 7 is a flowchart showing a flow of the operation of picking up the object 4 by the robot hand system 2 according to the first embodiment. FIG. 8 is a timing chart showing the flow of the operation of picking up the object 4 by the robot hand system 2 according to the first embodiment. FIG. 9 illustrates the flow of the operation of picking up the object 4 by the robot hand system 2 according to the first embodiment.

When the operation of picking up the object 4 is started, the pressures of the first space 74 and the first bag 70 of the first holder 52, and the pressures of the second space 94 and the second bag 90 of the second holder 54 are restored to the atmospheric pressure by the pressure regulating device 16.

As illustrated in FIG. 7, first, the integrated processor 28 of the controller 14 judges the position of the object 4 to be conveyed on the basis of the image information from the fixed camera 12 (S101). Then, the integrated processor 28 transmits the operation command signal to the robot controller 30 on the basis of the position of the object 4. The robot controller 30 controls the operation of the robot arm apparatus 6 on the basis of the operation command signal from the integrated processor 28, to move the robot hand apparatus 8 to a position just above the upper surface of the object 4 (S102). At this time, as illustrated in FIG. 9(a), the robot hand apparatus 8 is in a posture in which the longitudinal directions of the first holder 52 and the second holder 54 are tilted with respect to the vertical direction (Z-axis direction).

Then, the integrated processor 28 judges a region 108 that can be sucked of the upper surface of the object 4 (hereinafter, referred to as "sucked region 108") on the basis of the image information from the tip camera 10 (S103), and determines the sucking position of the first holder 52 in the sucked region 108 (S104). The integrated processor 28 transmits the operation command signal to the robot controller 30 on the basis of the determined sucking position. The robot controller 30 controls the operation of the robot arm apparatus 6 on the basis of the operation command signal from the integrated processor 28. Thus, as illustrated in FIG. 9(a), the robot hand apparatus 8 is lowered, and the distal end 52b of the first holder 52 touches the sucked region 108 of the upper surface of the object 4 (S105).

The robot hand apparatus 8 is further lowered and the distal end 52b of the first holder 52 is pressed to the sucked region 108 of the object 4 (S106). At this time, when the robot hand apparatus 8 is lowered while moved in a lateral direction (minus X-axis direction) such that the first sucking surface 60 does not slide on the sucked region 108, the first holder 52 is bent such that the first sucking surface 60 defines a protruding surface. As illustrated in FIG. 9(b), when the distal end 52b of the first holder 52 is continuously pressed to the sucked region 108 of the object 4, the first sucking surface 60 is bent at a first position 110. Thus, a region of the first sucking surface 60 between the first position 110 and the distal end 52b of the first holder 52 touches the sucked region 108.

At this time, the second holder 54 is moved to a position in advance so as not to interfere with the operation of the robot hand apparatus 8. If the distal end 54b of the second holder 54 interferes with an inner wall surface or the like of the package box 18, the second holder 54 may be bent by pressing a side surface of the second holder 54 on the side opposite to the second sucking surface 62 to the inner wall surface or the like of the package box 18.

The integrated processor 28 transmits the control signal to the pressure regulating device 16 on the basis of the image information from the tip camera 10. With the signal, the vacuum pump 34 is driven in the state in which the first valve 36 is closed, and the pressure of the first space 74 of the first holder 52 is reduced to be lower than the atmospheric pressure. Consequently, the sucked region 108 is sucked to the region of the first sucking surface 60 between the first position 110 and the distal end 52b of the first holder 52 using negative pressure at time t1 in FIG. 8 (S107).

Then, the integrated processor 28 transmits the driving signal to the robot hand apparatus 8, and transmits the operation command signal to the robot controller 30. With the signals, as illustrated in FIG. 9(c), the distance between the first holder 52 and the second holder 54 starts increasing at time t2 in FIG. 8, and the robot hand apparatus 8 starts rising (S108). Consequently, the first sucking surface 60 bent at the first position 110 extends straight due to the elastic restoring force of the first elastic member 68 in the state in which the object 4 is sucked to the first sucking surface 60 of the first holder 52 (S109). At this time, the region of the first sucking surface 60 between the first position 110 and the distal end 52b of the first holder 52 is vertically inverted, and hence the object 4 can be vertically inverted.

If the elastic restoring force of the first elastic member 68 is small, the pressure regulating device 16 may be provided with a compressor (not illustrated), so that air from the compressor is supplied to the first space 74 of the first holder 52. Thus, the pressure of the first space 74 is increased to be higher than the atmospheric pressure, and the first sucking surface 60 can extend straight.

Then, the integrated processor 28 transmits the control signal to the pressure regulating device 16. With the signal, the vacuum pump 34 is driven in the state in which the first valve 36 is closed, and the pressure in the first bag 70 of the first holder 52 and the pressure in the second bag 90 of the second holder 54 are reduced to be lower than the atmospheric pressure. Thus, the first holder 52 and the second holder 54 are hardened at time t3 in FIG. 8 (S110).

Then, the integrated processor 28 transmits the driving signal to the hand controller 32. With the signal, as illustrated in FIG. 9(d), the distance between the first holder 52 and the second holder 54 starts decreasing at time t4 in FIG. 8, and the object 4 is sandwiched between the first holder 52 and the second holder 54 (S111). At this time, the robot hand apparatus 8 is continuously rising.

Then, the integrated processor 28 transmits the control signal to the pressure regulating device 16 on the basis of the image information from the tip camera 10. With the signal, the vacuum pump 34 is driven in the state in which the first valve 36 is closed, and the pressure of the second space 94 of the second holder 54 is reduced to be lower than the atmospheric pressure. Consequently, the second sucking surface 62 of the second holder 54 is caused to suck the object 4 using negative pressure at time t5 in FIG. 8 (S112).

The object 4 is picked up from the package box 18 by the robot hand system 2 in this way.

1-3-2. Operation of Storing Object

Figure 10:
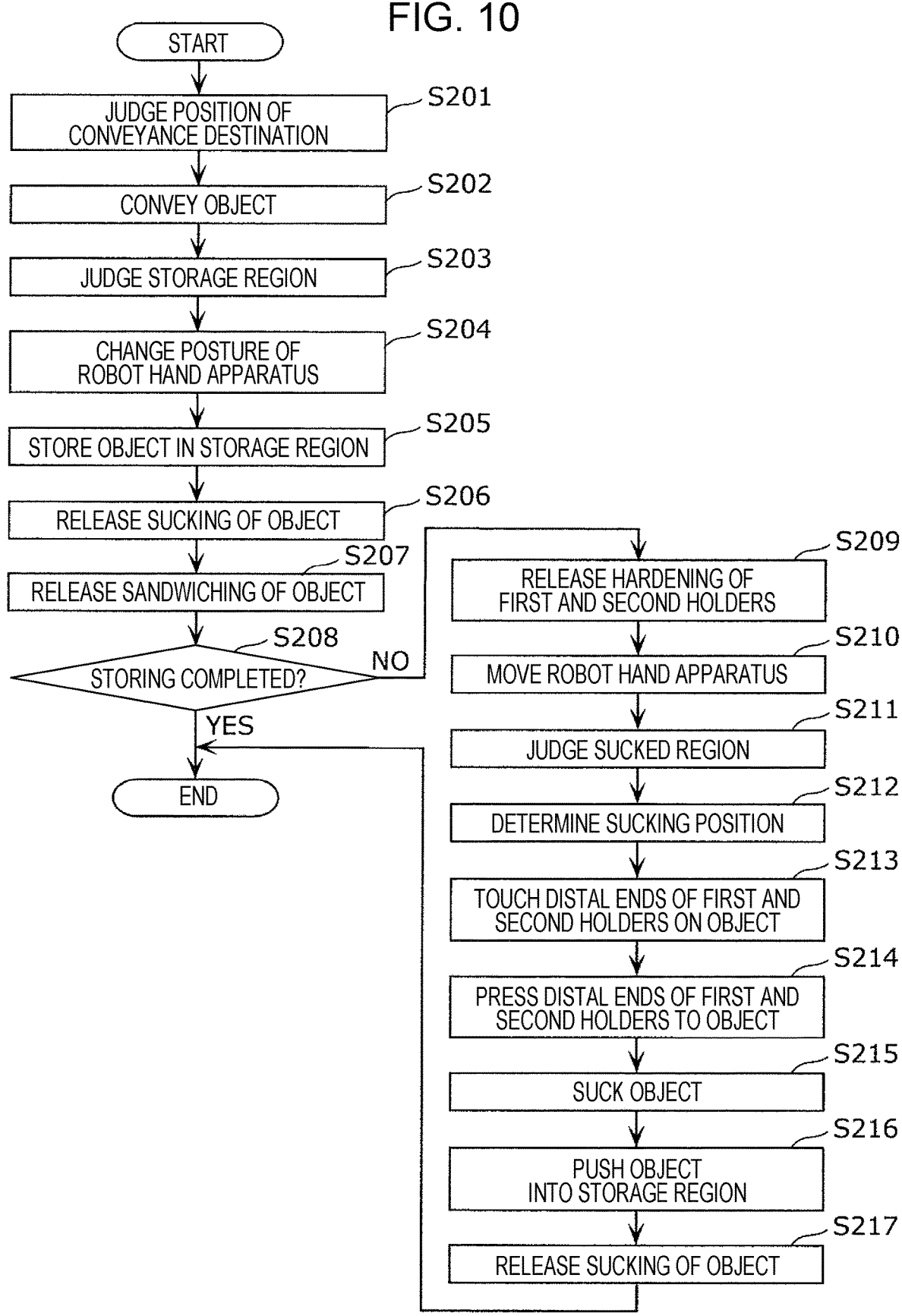
FIG. 10 is a flowchart showing a flow of operation of storing an object by the robot hand system according to the first embodiment.
Figure 11:
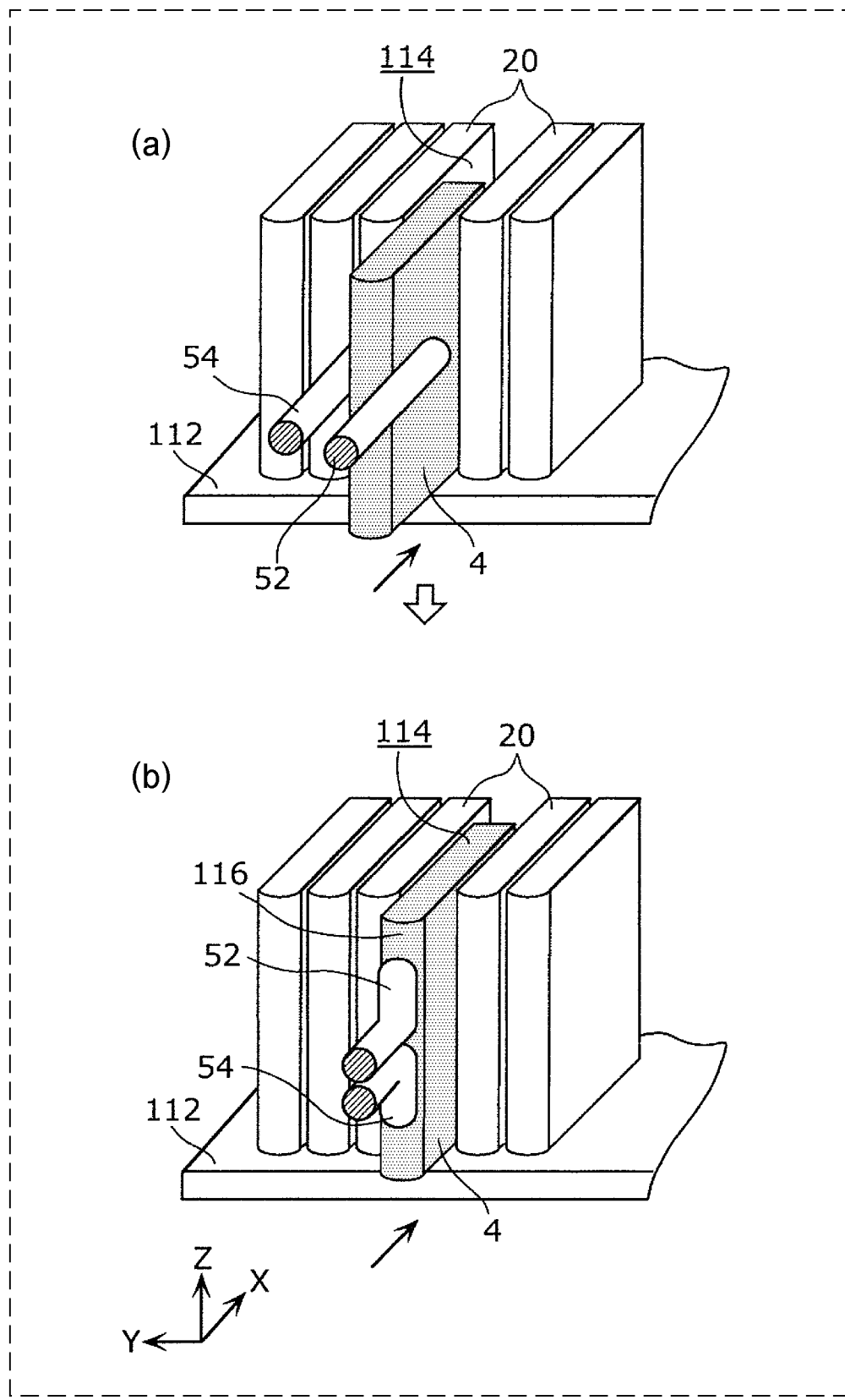
FIG. 11 illustrates the flow of the operation of storing the object by the robot hand system according to the first embodiment.
Figure 12:
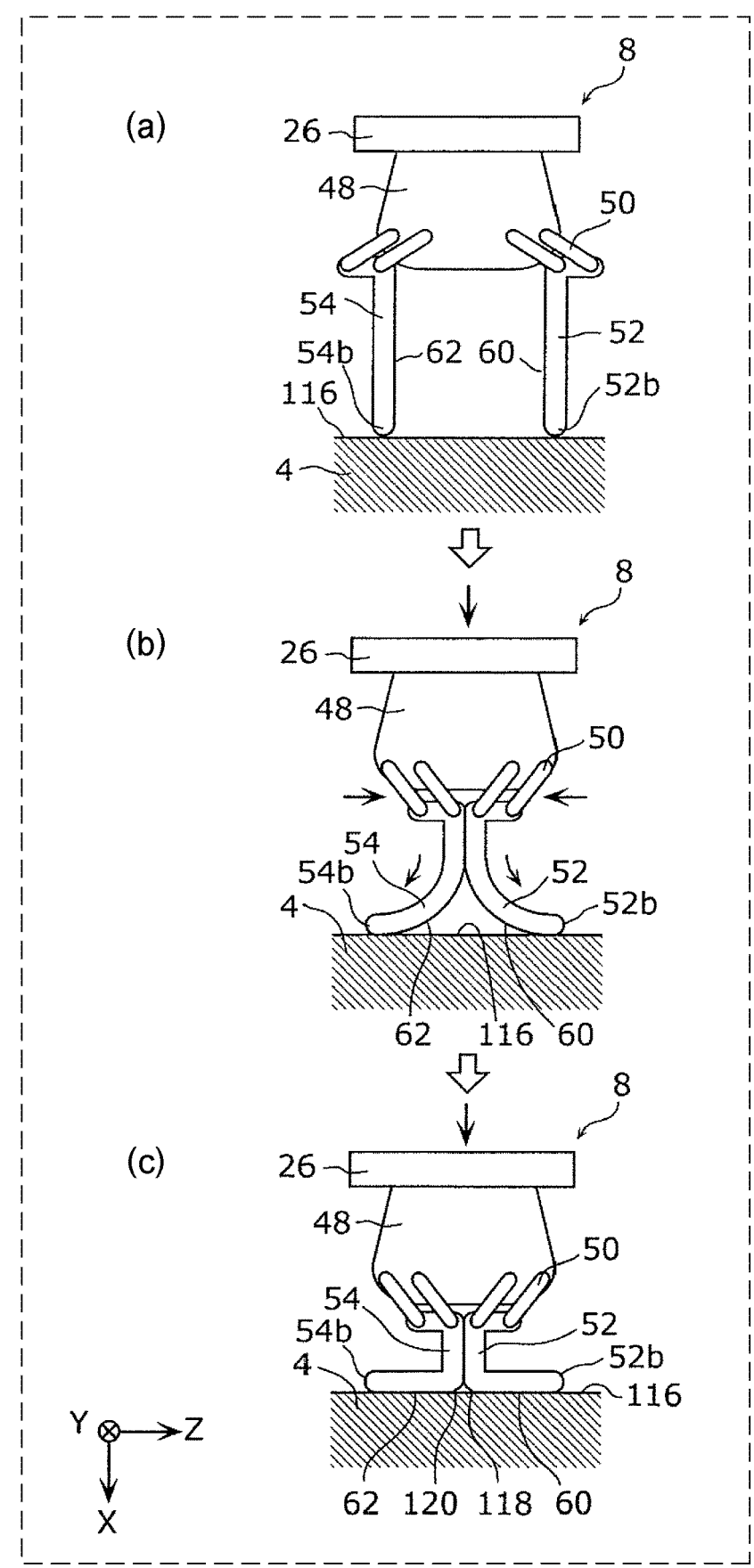
FIG. 12 illustrates a flow of operation of causing a first holder and a second holder of the robot hand system according to the first embodiment to suck an object.

Operation of storing the object 4 by the robot hand system 2 according to the first embodiment is described next with reference to FIGS. 10 to 12. FIG. 10 is a flowchart showing a flow of the operation of storing the object 4 by the robot hand system 2 according to the first embodiment. FIG. 11 illustrates the flow of the operation of storing the object 4 by the robot hand system 2 according to the first embodiment. FIG. 12 illustrates a flow of the operation of causing the first holder 52 and the second holder 54 of the robot hand system 2 according to the first embodiment to suck the object 4.

Described below is a case where an object 4 is to be stored in a storage shelf 112 illustrated in FIG. 11(a) in a state in which the object 4 is sucked to and sandwiched by the first holder 52 and the second holder 54 as illustrated in FIG. 11(a). As illustrated in FIG. 11(a), products 20 are placed side by side in a standing position on the storage shelf 112.

As illustrated in FIG. 10, the integrated processor 28 of the controller 14 judges the position of the storage shelf 112 that is a conveyance destination of the object 4 on the basis of the image information from the fixed camera 12 (S201). Then, the integrated processor 28 transmits the operation command signal to the robot controller 30 on the basis of the position of the conveyance destination of the object 4. The robot controller 30 controls the operation of the robot arm apparatus 6 on the basis of the operation command signal from the integrated processor 28, to move the robot hand apparatus 8 to the conveyance destination in a state in which the object 4 is sucked to and sandwiched by the first holder 52 and the second holder 54. Thus, the object 4 is conveyed to the storage shelf (S202).

In this case, the integrated processor 28 judges a region 114 that can store the object 4 (hereinafter, referred to as "storage region 114") at the conveyance destination on the basis of the image information from the tip camera 10 (S203). As illustrated in FIG. 11(a), the storage region 114 is a region of the storage shelf 112 between a pair of closely arranged products 20. The robot controller 30 controls the operation of the robot arm apparatus 6 on the basis of the operation command signal from the integrated processor 28, to change the posture of the robot hand apparatus 8 (S204) and to store the object 4 in the storage region 114 (S205).

Then, the integrated processor 28 transmits the control signal to the pressure regulating device 16 on the basis of the image information from the tip camera 10. With the signal, the driving of the vacuum pump 34 is stopped, the first valve 36 is opened, and the pressures of the first space 74 of the first holder 52 and the second space 94 of the second holder 54 are restored to the atmospheric pressure. Consequently, the sucking of the object 4 to the first sucking surface 60 and the second sucking surface 62 is released (S206). Then, the integrated processor 28 transmits the driving signal to the hand controller 32. With the signal, the distance between the first holder 52 and the second holder 54 increases, and the sandwiching of the object 4 by the first holder 52 and the second holder 54 is released (S207).

The integrated processor 28 judges whether the object 4 has been stored in the storage region 114 or not on the basis of the image information from the tip camera 10 (S208). For example, when the object 4 has been completely stored in the storage region 114, the integrated processor 28 judges that the object 4 has been completely stored in the storage region 114 (YES in S208), and the processing is ended.

In contrast, when the object 4 partly protrudes from the storage region 114, the integrated processor 28 judges that the object 4 has not been completely stored in the storage region 114 (NO in S208), and performs the control for pushing the object 4 into the storage region 114.

First, the integrated processor 28 transmits the control signal to the pressure regulating device 16. With the signal, the driving of the vacuum pump 34 is stopped, the first valve 36 is opened, and the pressures in the first bag 70 of the first holder 52 and the second bag 90 of the second holder 54 are restored to the atmospheric pressure. Consequently, the hardening of the first holder 52 and the second holder 54 is released (S209).

The integrated processor 28 transmits the operation command signal to the robot controller 30 on the basis of the image information from the fixed camera 12. The robot controller 30 controls the operation of the robot arm apparatus 6 on the basis of the operation command signal from the integrated processor 28, to move the robot hand apparatus 8 to a position just beside the object 4 (S210). At this time, as illustrated in FIG. 12(a), the robot hand apparatus 8 is held in a posture in which the longitudinal directions of the first holder 52 and the second holder 54 are parallel to the horizontal direction (X-axis direction).

Then, the integrated processor 28 judges a sucked region 116 of a side surface of the object 4 on the basis of the image information from the tip camera 10 (S211), and determines the sucking positions of the first holder 52 and the second holder 54 in the sucked region 116 (S212). The integrated processor 28 transmits the operation command signal to the robot controller 30 on the basis of the determined sucking positions. The robot controller 30 controls the operation of the robot arm apparatus 6 on the basis of the operation command signal from the integrated processor 28. Thus, as illustrated in FIG. 12(a), the robot hand apparatus 8 moves in the horizontal direction, and the distal end 52b of the first holder 52 and the distal end 54b of the second holder 54 touch the sucked region 116 of the object 4 (S213).

As illustrated in FIG. 12(b), the robot hand apparatus 8 further moves in the horizontal direction, and the distal end 52b of the first holder 52 and the distal end 54b of the second holder 54 are pressed to the sucked region 116 of the object 4 (S214). At this time, the distal end 52b of the first holder 52 and the distal end 54b of the second holder 54 move in a direction away from each other while sliding on the sucked region 116, and hence the first holder 52 and the second holder 54 are bent such that the first sucking surface 60 and the second sucking surface 62 define protruding surfaces.

The distal end 52b of the first holder 52 and the distal end 54b of the second holder 54 are continuously pressed to the sucked region 116 of the object 4 until the distal end 52b of the first holder 52 and the distal end 54b of the second holder 54 reach predetermined positions of the sucked region 116. At this time, the first sucking surface 60 and the second sucking surface 62 partly touch the sucked region 116.

When the distal end 52b of the first holder 52 and the distal end 54b of the second holder 54 have reached the predetermined positions of the sucked region 116, the integrated processor 28 transmits the control signal to the pressure regulating device 16 on the basis of the image information from the tip camera 10. With the signal, the vacuum pump 34 is driven in the state in which the first valve 36 is closed, and air is sucked from the first space 74 of the first holder 52 and the second space 94 of the second holder 54. Consequently, the first sucking surface 60 and the second sucking surface 62 partly suck the sucked region 116 using negative pressure (S215), and the distal end 52b of the first holder 52 and the distal end 54b of the second holder 54 are fixed at the predetermined positions of the sucked region 116.

In this state, the distal end 52b of the first holder 52 and the distal end 54b of the second holder 54 are further pressed to the sucked region 116 of the object 4, and hence, as illustrated in FIG. 12(c), the first sucking surface 60 and the second sucking surface 62 are respectively bent at substantially right angle at a first position 118 and a second position 120. Thus, a region of the first sucking surface 60 between the first position 118 and the distal end 52b of the first holder 52 sucks the sucked region 116 using negative pressure, and a region of the second sucking surface 62 between the second position 120 and the distal end 54b of the second holder 54 sucks the sucked region 116 using negative pressure.

As illustrated in FIG. 11(b), the robot hand apparatus 8 further moves in the horizontal direction, the object 4 is pushed into the storage region 114 in a state in which the object 4 is sucked to the first holder 52 and the second holder 54 (S216), and the object 4 is completely stored in the storage region 114. Then, the integrated processor 28 transmits the control signal to the pressure regulating device 16 on the basis of the image information from the tip camera 10. With the signal, the driving of the vacuum pump 34 is stopped, the first valve 36 is opened, and the pressures of the first space 74 of the first holder 52 and the second space 94 of the second holder 54 are restored to the atmospheric pressure.

Consequently, the sucking of the object 4 to the first sucking surface 60 and the second sucking surface 62 is released (S217).

The object 4 is stored in the storage shelf 112 by the robot hand system 2 in this way.

Note that, to pick up the object 4 from the storage shelf 112, the above-described operation may be performed in the reverse order. That is, the object 4 is sucked to the first sucking surface 60 and the second sucking surface 62, and the object 4 is pulled out from the storage region 114 to a position at which the object 4 can be sandwiched. Then, the sucking of the object 4 to the first sucking surface 60 and the second sucking surface 62 is released, the first sucking surface 60 and the second sucking surface 62 extend straight, and then the object 4 is sandwiched between the first holder 52 and the second holder 54.

Alternatively, the object 4 may be sandwiched between the first holder 52 and the second holder 54 without the sucking of the object 4 to the first sucking surface 60 and the second sucking surface 62. In this case, the first holder 52 and the second holder 54 may be hardened before the first holder 52 and the second holder 54 sandwich the object 4.

1-4. Advantages

In this embodiment, the object 4 can be sucked to the first sucking surface 60 using negative pressure and picked up in the state in which the first sucking surface 60 is bent at any position. Thus, for example, even when the object 4 is arranged in a narrow space such as the inside of the package box 18, the object 4 can be easily picked up by appropriately bending the first sucking surface 60 in accordance with the size or shape of the space, while the robot hand apparatus 8 is prevented from interfering with the package box 18 or the like. Furthermore, since the distance between the first holder 52 and the second holder 54 is decreased by the driving mechanism 50 in the state in which the object 4 is sucked to the first sucking surface 60, the object 4 can be sandwiched between the first holder 52 and the second holder 54. Thus, for example, the object 4 can be conveyed while the object 4 is reliably held.

Second Embodiment 2-1. Configuration of Robot Hand Apparatus

Figure 13:
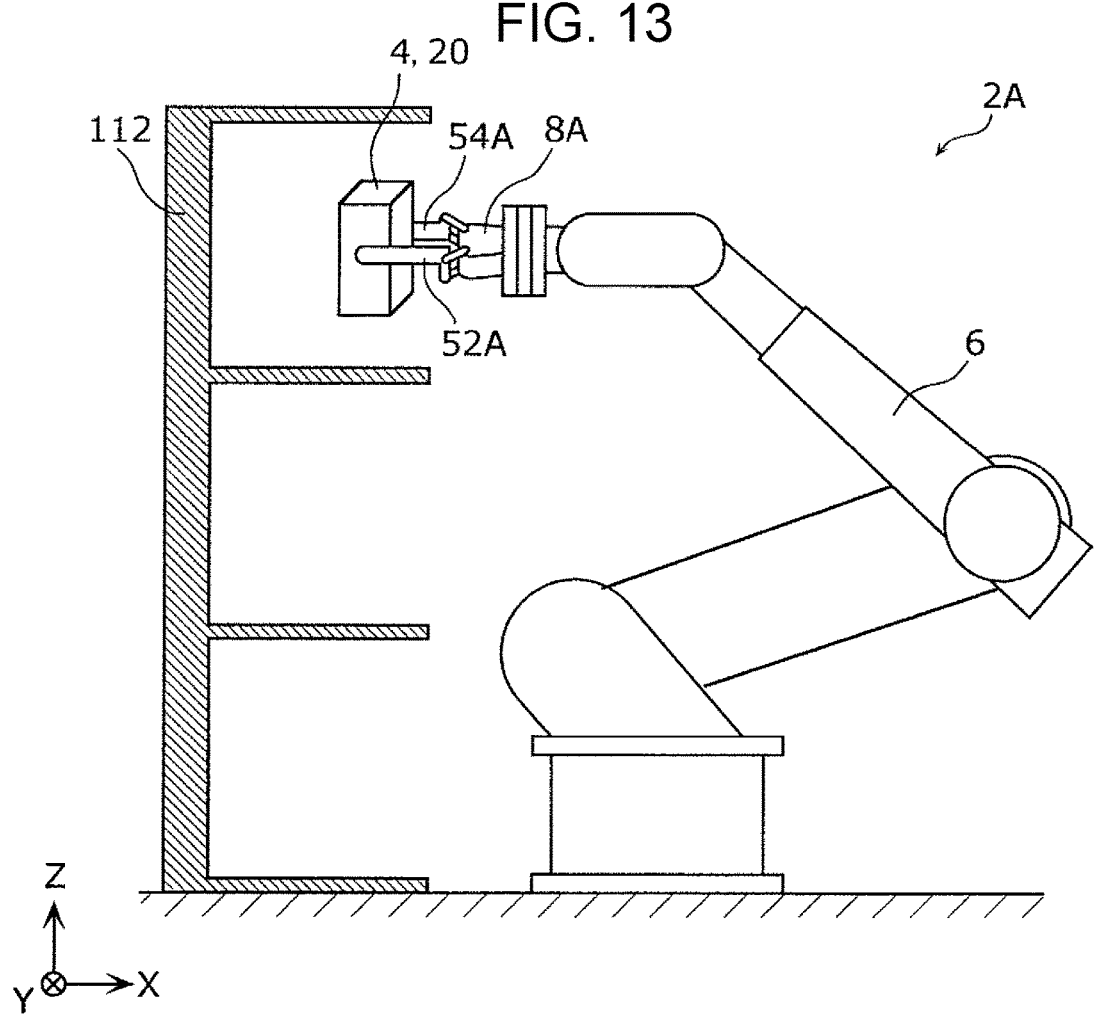
FIG. 13 partly illustrates a robot hand system according to a second embodiment.
Figure 14:
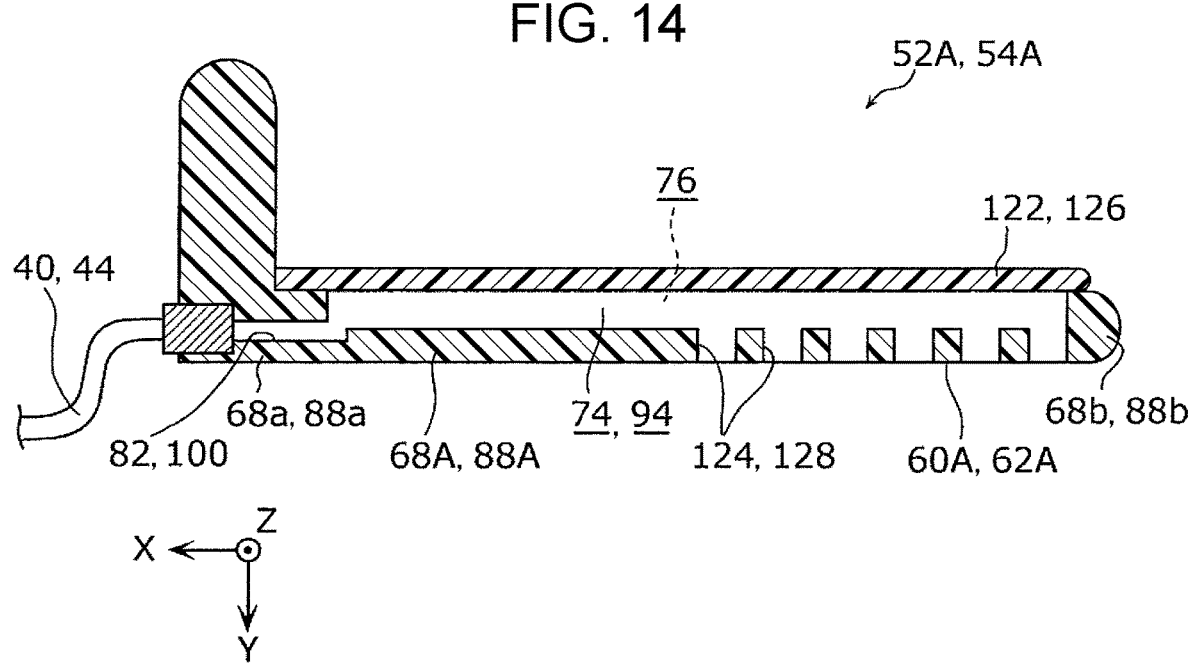
FIG. 14 is a cross-sectional view illustrating a first holder (second holder) of the robot hand apparatus according to the second embodiment.

A configuration of a robot hand apparatus 8A according to a second embodiment is described next with reference to FIGS. 13 and 14. FIG. 13 partly illustrates a robot hand system 2A according to the second embodiment. FIG. 14 is a cross-sectional view illustrating a first holder 52A (second holder 54A) of the robot hand apparatus 8A according to the second embodiment. FIG. 13 does not illustrate the tip camera 10, the fixed camera 12, the controller 14, and the pressure regulating device 16 for the convenience of the description. In this embodiment, the same reference signs are applied to the same components as those of the first embodiment, and the redundant description thereof is omitted.

As illustrated in FIG. 13, in the robot hand system 2A according to the second embodiment, the configurations of the first holder 52A and the second holder 54A of the robot hand apparatus 8A differ from those of the first embodiment. Specifically, the method of causing the first holder 52A and the second holder 54A to suck the object 4 differs from that of the first embodiment. The robot hand apparatus 8A according to the second embodiment does not have the function of hardening the first holder 52A and the second holder 54A.

As illustrated in FIG. 14, the first holder 52A has a first elastic member 68A and a first sealing member 122. That is, the first holder 52A does not have the first bag 70 and the first particles 72 described in the first embodiment.

A first sucking surface 60A of the first elastic member 68A has first sucking holes 124 which are circular in plan view and through which the first space 74 communicates with the outside. In this embodiment, the first sucking holes 124 are arranged in a region between a center portion and a distal end 68b in the longitudinal direction of the first elastic member 68A. Alternatively, the first sucking holes 124 may be arranged in the entire region of the first sucking surface 60A.

The first sealing member 122 is a thin-plate member that seals the opening 76 of the first elastic member 68A. The first sealing member 122 is formed of an elastic soft resin, for example, an elastomer such as silicone rubber. The first sealing member 122 is arranged so as to cover the first space 74 from a lateral side. Thus, the first space 74 is formed in a region surrounded by the first elastic member 68A and the first sealing member 122.

The second holder 54A has a second elastic member 88A and a second sealing member 126, similarly to the first holder 52A. That is, the second holder 54A does not have the second bag 90 and the second particles 92 described in the first embodiment.

A second sucking surface 62A of the second elastic member 88A has second sucking holes 128 which are circular in plan view and through which the second space 94 communicates with the outside. In this embodiment, the second sucking holes 128 are arranged in a region between a center portion and a distal end 88b in the longitudinal direction of the second elastic member 88A. Alternatively, the second sucking holes 128 may be arranged in the entire region of the second sucking surface 62A.

The second sealing member 126 is arranged so as to cover the second space 94 of the second elastic member 88A from a lateral side, similarly to the first sealing member 122.

2-2. Operation of Robot Hand System 2-2-1. Operation of Picking Up Object

Figure 15:
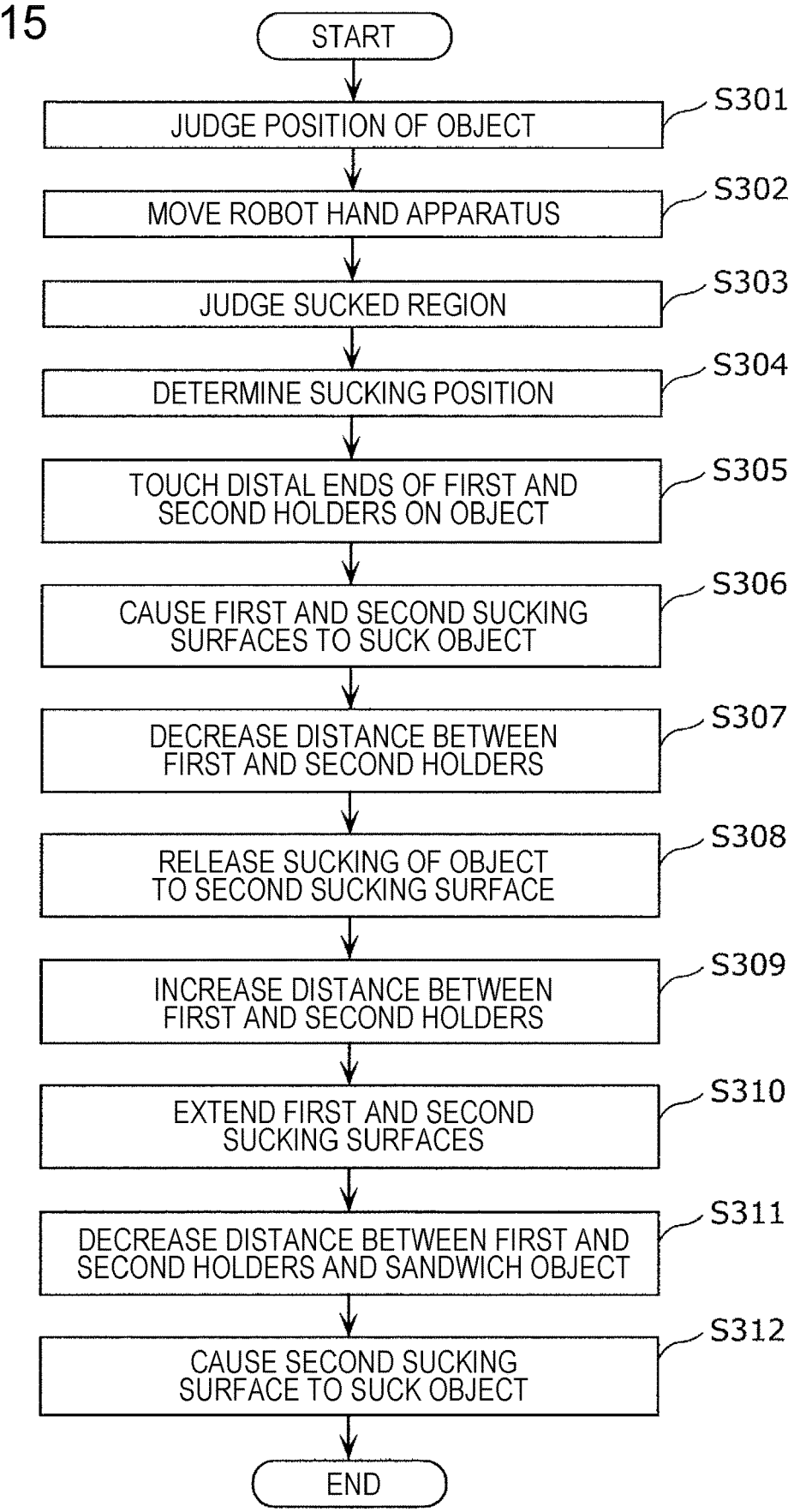
FIG. 15 is a flowchart showing a flow of operation of picking up an object while the orientation of the object is corrected by the robot hand system according to the second embodiment.
Figure 16:
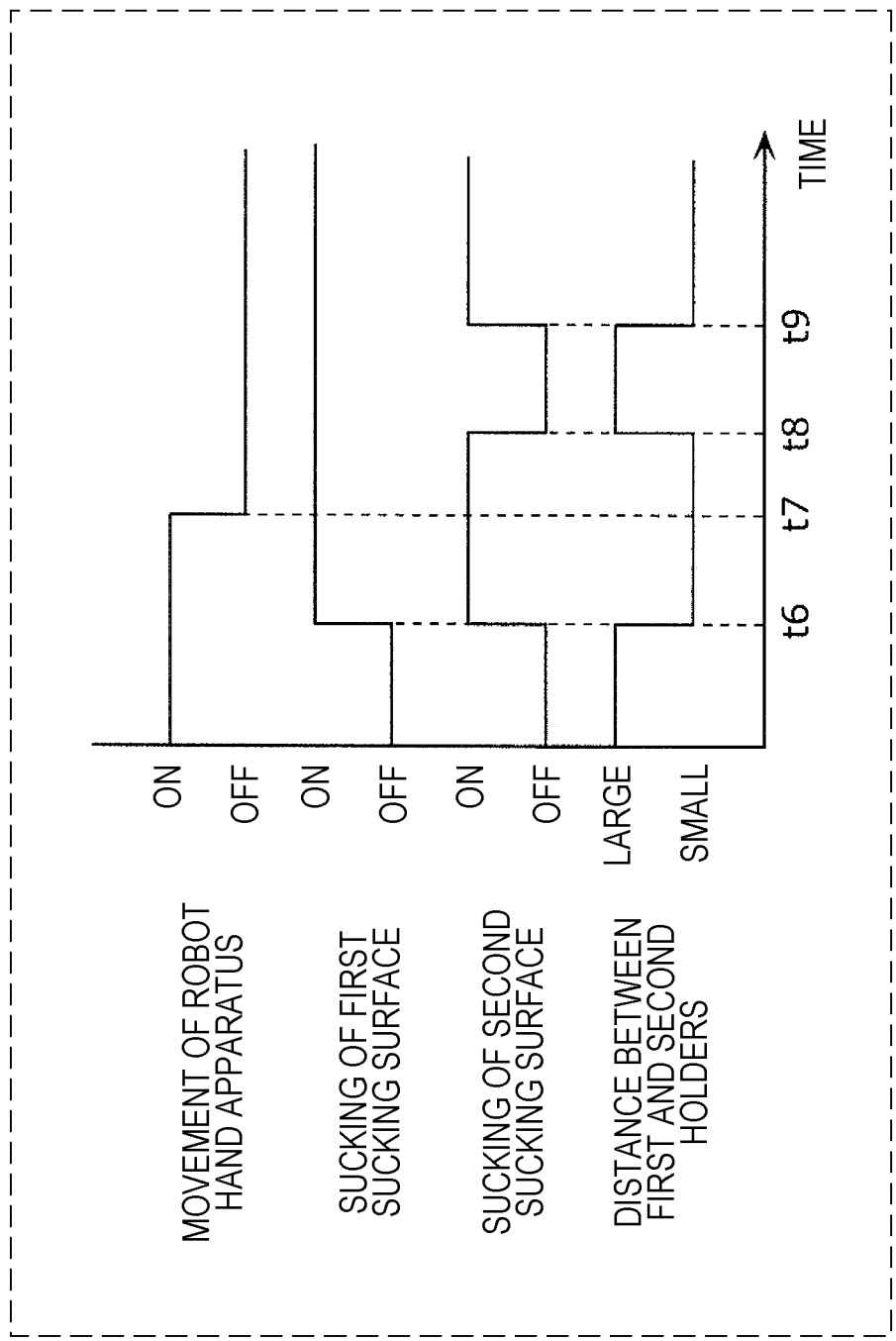
FIG. 16 is a timing chart showing the flow of the operation of picking up the object while the orientation of the object is corrected by the robot hand system according to the second embodiment.
Figure 17:
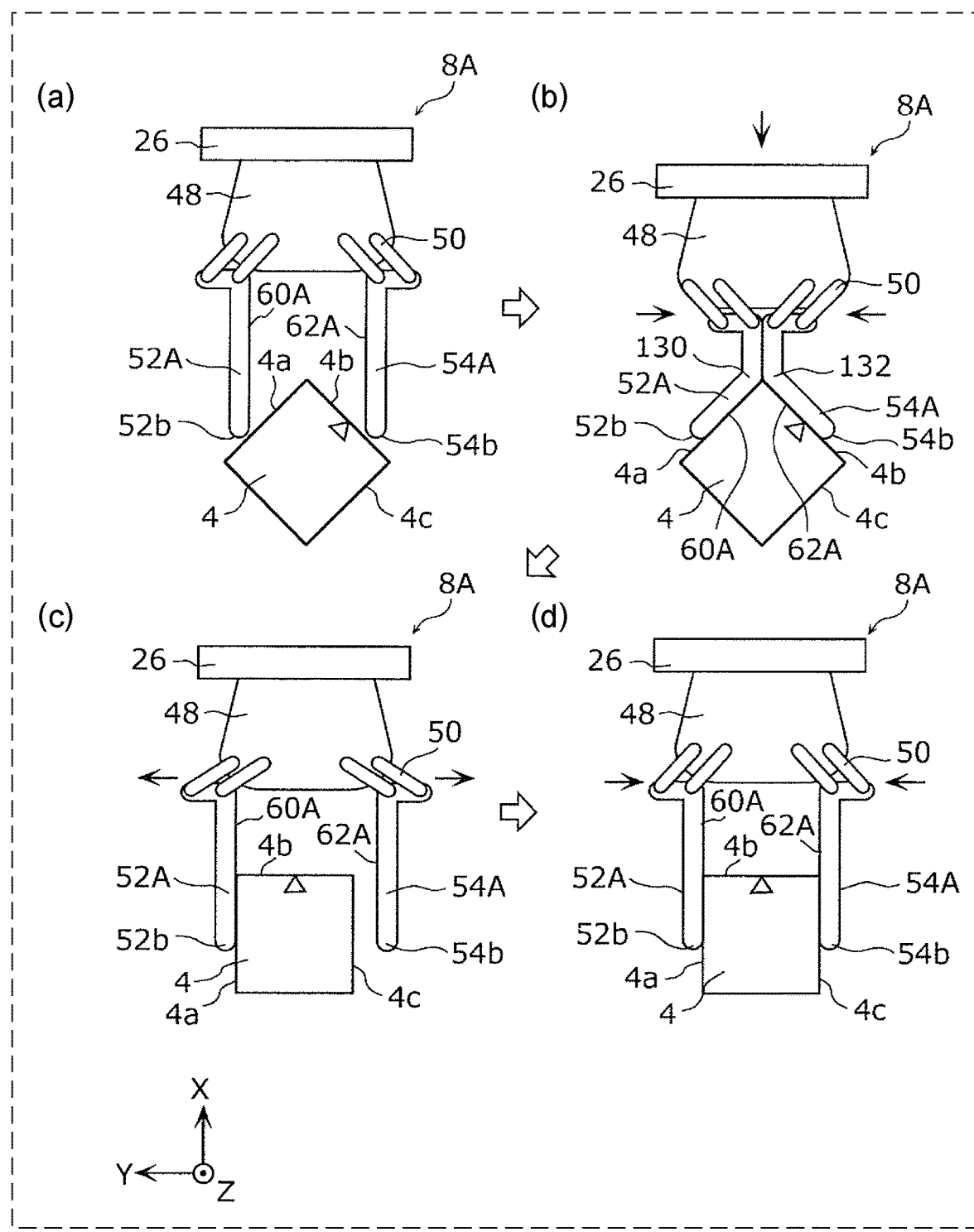
FIG. 17 illustrates the flow of the operation of picking up the object while the orientation of the object is corrected by the robot hand system according to the second embodiment.

Operation of picking up the object 4 while the orientation of the object 4 is changed by the robot hand system 2A according to the second embodiment is described next with reference to FIGS. 15 to 17. FIG. 15 is a flowchart showing a flow of the operation of picking up the object 4 while the orientation of the object 4 is corrected by the robot hand system 2A according to the second embodiment. FIG. 16 is a timing chart showing the flow of the operation of picking up the object 4 while the orientation of the object 4 is corrected by the robot hand system 2A according to the second embodiment. FIG. 17 illustrates the flow of the operation of picking up the object 4 while the orientation of the object 4 is corrected by the robot hand system 2A according to the second embodiment.

Described below is a case of picking up an object 4 from among products 20 while the orientation of the object 4 is corrected when the products 20 are placed on the storage shelf 112 in an untidy manner. The object 4 has, for example, a cubic shape.

As illustrated in FIG. 15, steps S301 to S304 are executed similarly to steps S101 to S104 described in the first embodiment.

The robot controller 30 (see FIG. 1) controls the operation of the robot arm apparatus 6 on the basis of the operation command signal from the integrated processor 28 (see FIG. 1). Thus, as illustrated in FIG. 17(a), the robot hand apparatus 8A moves in the horizontal direction (X-axis direction), and the distal end 52b of the first holder 52A and the distal end 54b of the second holder 54A touch a first side surface 4a and a second side surface 4b of the object 4 (S305). Note that the first side surface 4a and the second side surface 4b of the object 4 are non-parallel to each other.

Then, the integrated processor 28 transmits the control signal to the pressure regulating device 16 (see FIG. 1) on the basis of the image information from the tip camera 10 (see FIG. 1). With the signal, the vacuum pump 34 (see FIG. 1) is driven in the state in which the first valve 36 (FIG. 1) is closed, and air is sucked through the first sucking holes 124 of the first holder 52A and the second sucking holes 128 of the second holder 54A. Consequently, the first sucking surface 60A starts sucking the first side surface 4a of the object 4 using negative pressure, and the second sucking surface 62A starts sucking the second side surface 4b of the object 4 using negative pressure at time t6 in FIG. 16 (S306), and thus the distal end 52b of the first holder 52A and the distal end 54b of the second holder 54A are respectively fixed onto the first side surface 4a and the second side surface 4b of the object 4.

Furthermore, the distance between the first holder 52A and the second holder 54A is decreased by the driving mechanism 50 at time t6 in FIG. 16 (S307), and the distal end 52b of the first holder 52A and the distal end 54b of the second holder 54A are respectively pressed to the first side surface 4a and the second side surface 4b of the object 4. Then, the movement of the robot hand apparatus 8A in the horizontal direction is stopped at time t7 in FIG. 16. Thus, as illustrated in FIG. 17(b), the first sucking surface 60A and the second sucking surface 62A are respectively bent at a first position 130 and a second position 132. Thus, a region of the first sucking surface 60A between the first position 130 and the distal end 52b of the first holder 52A sucks the first side surface 4a of the object 4 using negative pressure, and a region of the second sucking surface 62A between the second position 132 and the distal end 54b of the second holder 54A sucks the second side surface 4b of the object 4 using negative pressure.

Then, the integrated processor 28 transmits the control signal to the pressure regulating device 16 on the basis of the image information from the tip camera 10. With the signal, the driving of the vacuum pump 34 is stopped, the first valve 36 is opened, and the pressure of the second space 94 of the second holder 54A is restored to the atmospheric pressure. Consequently, the sucking of the second side surface 4b of the object 4 to the second sucking surface 62A is released at time t8 in FIG. 16 (S308).

Furthermore, as illustrated in FIG. 17(c), the distance between the first holder 52A and the second holder 54A is increased by the driving mechanism 50 at time t8 in FIG. 16 (S309), and thus the first sucking surface 60A and the second sucking surface 62A extend straight due to the elastic restoring force of the first elastic member 68A and the second elastic member 88A (S310).

Thus, as illustrated in FIG. 17(d), the distance between the first holder 52A and the second holder 54A is decreased by the driving mechanism 50 at time t9 in FIG. 16, and thus the object 4 is sandwiched between the first holder 52A and the second holder 54A (S311). Furthermore, the vacuum pump 34 is driven in the state in which the first valve 36 is closed, and air is sucked through the second sucking holes 128 of the second holder 54A at time t9 in FIG. 16. Consequently, the second sucking surface 62A sucks a third side surface 4c of the object 4 using negative pressure (S312). Note that the second side surface 4b and the third side surface 4c of the object 4 are non-parallel to each other.

The object 4 is picked up while the orientation of the object 4 is corrected, and the object 4 can be sucked to and sandwiched by the first holder 52A and the second holder 54A.

2-2-2. Operation of Changing Orientation of Object by 90°

Figure 18:
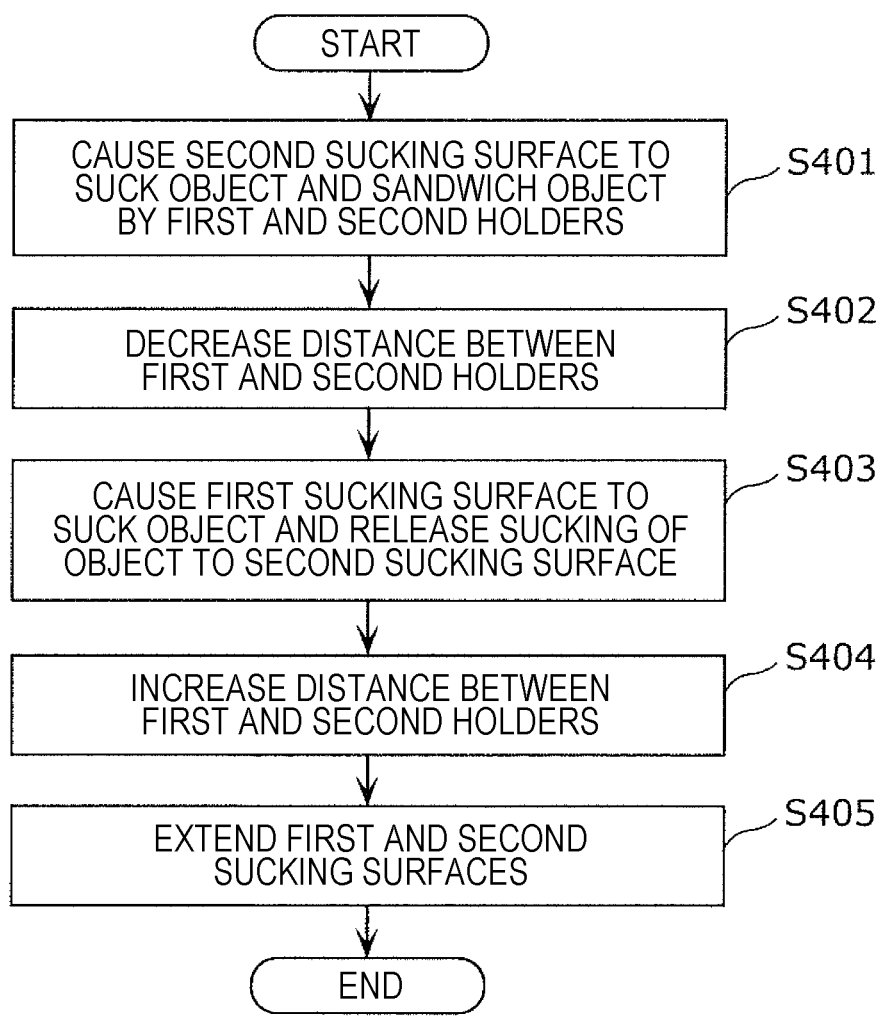
FIG. 18 is a flowchart showing a flow of operation of changing the orientation of an object by 90° by the robot hand system according to the second embodiment.
Figure 19:
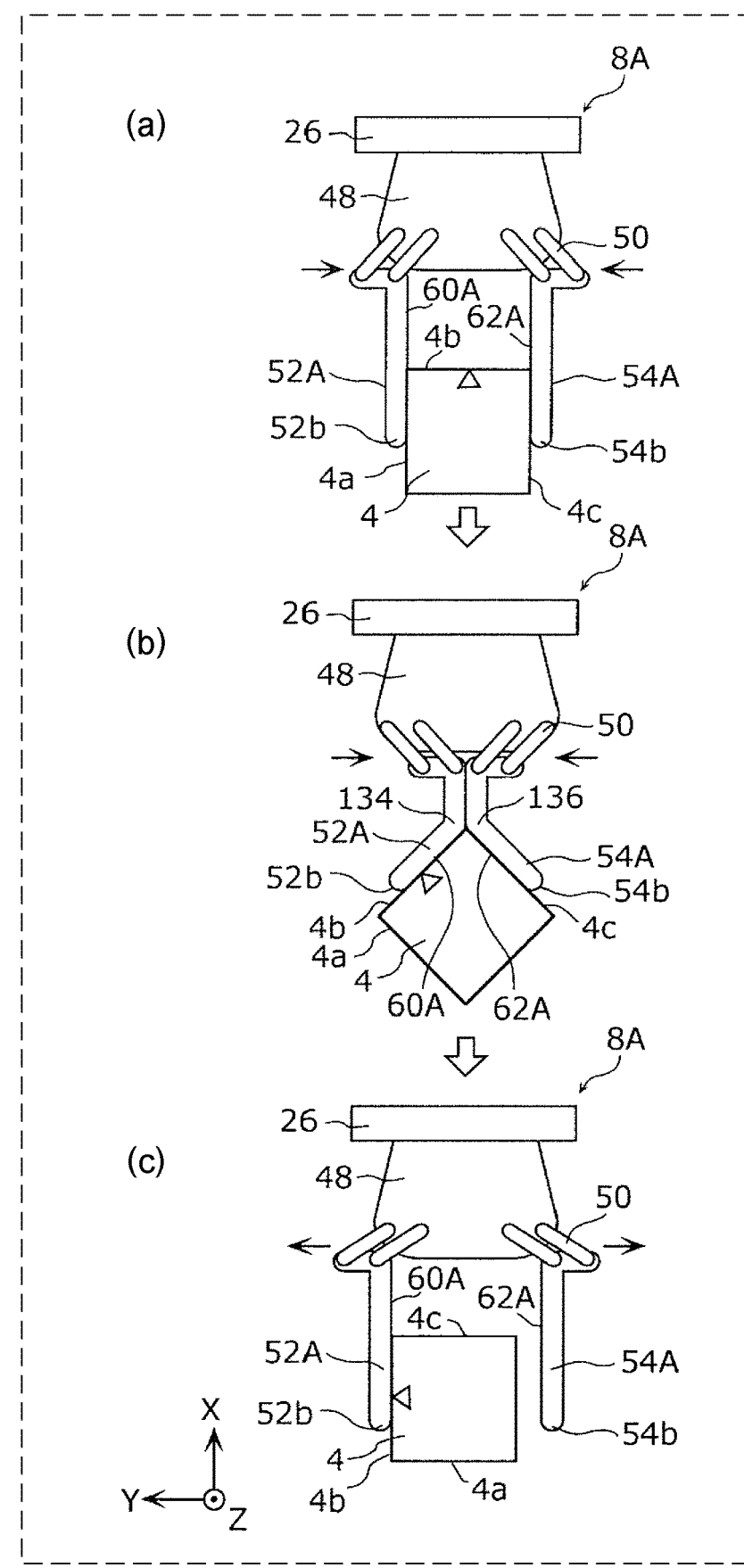
FIG. 19 is a flowchart showing a flow of operation of changing the orientation of the object by 90° by the robot hand system according to the second embodiment.

Operation of changing the orientation of the object 4 by 90° by the robot hand system 2A according to the second embodiment is described next with reference to FIGS. 18 and 19. FIG. 18 is a flowchart showing a flow of the operation of changing the orientation of an object 4 by 90° by the robot hand system 2A according to the second embodiment. FIG. 19 illustrates the flow of the operation of changing the orientation of the object 4 by 90° by the robot hand system 2A according to the second embodiment.

Described below is a case where the orientation of the object 4 is changed by 90° by rotating the object 4 by 90° around the Z axis from the state in which the object 4 is sandwiched by the first holder 52A and the second holder 54A as illustrated in FIG. 19(a).

First, as illustrated in FIG. 18, the first sucking surface 60A touches the first side surface 4a of the object 4, and the second sucking surface 62A sucks the third side surface 4c of the object 4, so that the object 4 is sandwiched between the first holder 52A and the second holder 54A (S401). When this operation is performed subsequently to the above-described operation illustrated in FIGS. 15 to 17, the sucking of the first side surface 4a of the object 4 to the first sucking surface 60A is released. Then, the distance between the first holder 52A and the second holder 54A is decreased by the driving mechanism 50 in the state in which the third side surface 4c of the object 4 is sucked to the second sucking surface 62A (S402). Thus, as illustrated in FIG. 19(b), the object 4 is rotated counterclockwise by 45° in FIG. 19(b) as the result of the movement of the second holder 54A, and the first sucking surface 60A touches the second side surface 4b of the object 4. At this time, the first sucking surface 60A and the second sucking surface 62A are respectively bent at a third position 134 and a fourth position 136.

Then, the first sucking surface 60A sucks the second side surface 4b of the object 4, and the sucking of the third side surface 4c of the object 4 to the second sucking surface 62A is released (S403). Then, as illustrated in FIG. 19(c), the distance between the first holder 52A and the second holder 54A is increased by the driving mechanism 50 in the state in which the second side surface 4b of the object 4 is sucked to the first sucking surface 60A (S404). Thus, the object 4 follows the movement of the first holder 52A, and is further rotated counterclockwise by 45° in FIG. 19(c). At this time, the first sucking surface 60A and the second sucking surface 62A extend straight due to the elastic restoring force of the first elastic member 68A and the second elastic member 88A (S405).

The orientation of the object 4 can be changed by 90° in this way. By performing the above-described operation again, the orientation of the object 4 can be changed by 180°. Moreover, by performing the operation of the first holder 52A and the second holder 54A in the reverse order, the object 4 can be rotated in the reverse direction to the above-described direction (clockwise in FIG. 19).

2-3. Advantages

In this embodiment, for example, even when the object 4 is arranged in a narrow space such as the inside of the storage shelf 112, the first sucking surface 60A and the second sucking surface 62A can be appropriately bent in accordance with the size and shape of the space. Thus, the orientation of the object 4 can be corrected and the object 4 can be held while the robot hand apparatus 8A is prevented from interfering with the storage shelf 112 or the like.

Other Modifications

While the robot hand apparatus according to one or multiple aspects has been described above with reference to the first and second embodiments, the present disclosure is not limited to the first and second embodiments. Embodiments modified in various ways conceivable by those skilled in the art and an embodiment constructed by combining components in different embodiments may be included within the scope of one or multiple aspects as long as the embodiments are not departing from the spirit of the present disclosure.

While the robot hand apparatus includes the two holders in any of the above-described embodiments, it is not limited thereto, and the robot hand apparatus may include one, or three or more holders.

In any of the above-described embodiments, the first sucking surface and the second sucking surface are respectively formed at the first holder and the second holder. However, it is not limited thereto, and the second sucking surface may be omitted from the second holder.

In any of the above-described embodiments, each component may be formed of dedicated hardware or may be provided by executing a software program suitable for each component. Each component may be provided by a program executing unit, such as a central processing unit (CPU) or a processor, reading a software program stored in a storage medium, such as a hard disk or a semiconductor memory.

The components constituting each of the above-described apparatuses and devices may be partly or entirely formed of an integrated circuit (IC) card or a single module that is removably attached to the apparatus or device. The IC card or the module is a computer system formed of a microprocessor, a read-only memory (ROM), a random-access memory (RAM), or the like. The IC card or the module may include a super multi-functional large scale integrated (LSI) circuit. The microprocessor operates in accordance with the computer program and thus the IC card or the module provides the function. The IC card or the module may be tamper resistant.

The present disclosure may be a method as one described above. The method may be provided by a computer program executed by a computer, or may be a digital signal composed of the computer program. The present disclosure may be a computer-readable storage medium storing the computer program or the digital signal. The storage medium is, for example, a flexible disk, a hard disk, a CD-ROM, a magneto-optical (MO) disk, a digital versatile disk (DVD), a DVD-ROM, a DVD-RAM, Blu-ray (BD) Disc (registered trademark), or a semiconductor memory. The present disclosure may be the digital signal stored in such a storage medium. According to the present disclosure, the computer program or the digital signal may be transmitted via an electric communication line, a wireless or wired communication line, a network typically represented by the Internet, or data broadcasting. The present disclosure may be a computer system including a microprocessor and a memory, the memory may store the computer program, and the microprocessor may be operated in accordance with the computer program. The present disclosure may be implemented by another independent computer system by storing the program or the digital signal in the storage medium and transferring the storage medium, or by transferring the program or the digital signal via the network or the like.

The robot hand apparatus according to the present disclosure is useful for a robot hand system that picks up, for example, a product in a warehouse of a store.

What is claimed is:

1. A robot hand apparatus, comprising:
   a first holder having a first sucking surface that is bendable convexly at any position and configured to suck an object using negative pressure;
   a second holder arranged to oppose the first sucking surface of the first holder; and
   a driving mechanism configured to change a distance between the first holder and the second holder to sandwich the object between the first holder and the second holder.

2. The robot hand apparatus according to claim 1,
   wherein the second holder has a second sucking surface that is bendable at any position and configured to suck the object using negative pressure, and
   wherein the first holder and the second holder are arranged such that the first sucking surface opposes the second sucking surface.

3. The robot hand apparatus according to claim 2,
   wherein a first space is defined in the first holder,
   wherein a second space is defined in the second holder,
   wherein the first sucking surface has a first thick portion and a first thin portion that is thinner than the first thick portion,
   wherein the second sucking surface has a second thick portion and a second thin portion that is thinner than the second thick portion,
   wherein the first thin portion is configured to be deformed to protrude toward the first space and suck the object using negative pressure when a pressure of the first space is reduced to be lower than an atmospheric pressure, and
   wherein the second thin portion is configured to be deformed to protrude toward the second space and suck the object using negative pressure when a pressure of the second space is reduced to be lower than the atmospheric pressure.

4. The robot hand apparatus according to claim 2,
   wherein the first sucking surface has a first sucking hole through which air is to be sucked,
   wherein the second sucking surface has a second sucking hole through which air is to be sucked,
   wherein the first sucking surface is configured to suck the object using negative pressure when air is sucked through the first sucking hole, and
   wherein the second sucking surface is configured to suck the object using negative pressure when air is sucked through the second sucking hole.

5. The robot hand apparatus according to claim 2,
   wherein the first holder has
   a first bag that can contract when a pressure in the first bag is reduced to be lower than an atmospheric pressure, and
   first particles filled in the first bag, and
   wherein the second holder has
   a second bag that can contract when a pressure in the second bag is reduced to be lower than the atmospheric pressure, and
   second particles filled in the second bag.

6. A robot hand system, comprising:
   the robot hand apparatus according to claim 1;
   a robot arm apparatus configured to support the robot hand apparatus and change a position or a posture of the robot hand apparatus;
   a pressure regulating device configured to suck air from the first holder or the second holder; and
   a controller configured to control the robot hand apparatus, the robot arm apparatus, and the pressure regulating device so that the robot hand apparatus holds the object.

7. The robot hand system according to claim 6, further comprising:
   an imaging device configured to image capture the object, wherein the controller is configured to judge a sucked region that can be sucked of a sucked surface of the object based on a result of the image capture by the imaging device, and thus determine a sucking position of the first holder.

8. The robot hand apparatus according to claim 1, wherein the first sucking surface is configured to be bent convexly toward the second holder to cause a region of the first sucking surface, between a first position and a distal end of the first holder, to suck the object.

9. The robot hand apparatus according to claim 8, wherein, when the first sucking surface is bent at the first position, an angle between: (i) the region of the first sucking surface between the first position and the distal end of the first holder; and (ii) another region of the first sucking surface between the first position and a proximal end of the first holder is more than 90 degrees.

10. A holding method using a robot hand apparatus, the robot hand apparatus including
a first holder having a first sucking surface that is bendable at any position and configured to suck an object using negative pressure,
a second holder arranged to oppose the first sucking surface of the first holder, and
a driving mechanism configured to change a distance between the first holder and the second holder,
the method comprising:
touching a distal end of the first holder on the object;
pressing the distal end of the first holder to the object, and thus bending the first sucking surface at a first position;
bending the first sucking surface convexly to cause a region of the first sucking surface between the first position and the distal end of the first holder to suck the object;
extending the first sucking surface bent at the first position in a state in which the first sucking surface sucks the object; and
decreasing the distance between the first holder and the second holder, and thus sandwiching the object between the first holder and the second holder.

11. The holding method according to claim 10, wherein a hardness of the first holder and a hardness of the second holder are changeable, and
wherein, when the object is sandwiched, the object is sandwiched between the first holder and the second holder, in a state in which the first holder and the second holder are hardened.

12. The holding method according to claim 10, wherein the second holder has a second sucking surface configured to suck the object using negative pressure,
wherein the first holder and the second holder are arranged such that the first sucking surface opposes the second sucking surface, and
wherein the holding method further comprises causing the second sucking surface to suck the object after the object is sandwiched.

13. The holding method according to claim 10, wherein, when the region is caused to suck the object, the region of the first sucking surface is caused to suck an upper surface of the object, and
wherein, when the first sucking surface is extended, the first sucking surface bent at the first position is extended while the object is vertically inverted.

14. The holding method according to claim 10, further comprising:
image capturing the object using an imaging device;
judging a sucked region that is included in a sucked surface of the object and that can be sucked to the first sucking surface based on a result of the image capture by the imaging device; and
determining a sucking position of the first holder based on a size of the sucked region.

15. The holding method according to claim 10, wherein, in bending the first sucking surface convexly, the first sucking surface is bent toward the second holder.

16. The holding method according to claim 15, wherein, when the first sucking surface is bent at the first position, an angle between: (i) the region of the first sucking surface between the first position and the distal end of the first holder; and (ii) another region of the first sucking surface between the first position and a proximal end of the first holder is more than 90 degrees.

17. A holding method using a robot hand apparatus, the robot hand apparatus including
a first holder having a first sucking surface that is bendable at any position and configured to suck an object using negative pressure,
a second holder having a second sucking surface that is bendable at any position and configured to suck the object using negative pressure, and
a driving mechanism configured to change a distance between the first holder and the second holder,
the first holder and the second holder being arranged such that the first sucking surface opposes the second sucking surface,
the method comprising:
touching a distal end of the first holder on a first side surface of an object, and touching a distal end of the second holder on a second side surface of the object that is non-parallel to the first side surface of the object;
decreasing the distance between the first holder and the second holder, and thus bending the first sucking surface at a first position and bending the second sucking surface at a second position;
causing a region of the first sucking surface between the first position and the distal end of the first holder to suck the first side surface of the object, and causing a region of the second sucking surface between the second position and the distal end of the second holder to suck the second side surface of the object;
releasing the sucking of the second sucking surface to the second side surface of the object; and
extending the first sucking surface bent at the first position and the second sucking surface bent at the second position while the distance between the first holder and the second holder is increased in a state in which the first sucking surface sucks the first side surface of the object.

18. The holding method according to claim 17, further comprising:
touching the distal end of the first holder on the first side surface of the object, and touching the distal end of the second holder on a third side surface of the object that is non-parallel to the second side surface of the object;
causing the second sucking surface to suck the third side surface of the object;
decreasing the distance between the first holder and the second holder in a state in which the second sucking surface sucks the third side surface of the object, and thus bending the first sucking surface at a third position and bending the second sucking surface at a fourth position;

causing a region of the first sucking surface between the third position and the distal end of the first holder to suck the second side surface of the object;

releasing the sucking of the second sucking surface to the third side surface of the object; and extending the first sucking surface bent at the third position and the second sucking surface bent at the fourth position while the distance between the first holder and the second holder is increased in a state in which the first sucking surface sucks the second side surface of the object.

19. A robot hand apparatus, comprising:

a first holder having a first sucking surface that is bendable convexly at any position and configured to suck an object using negative pressure;

a second holder arranged to oppose the first sucking surface of the first holder; and a rotary actuator configured to change a distance between the first holder and the second holder to sandwich the object between the first holder and the second holder.

20. The robot hand apparatus according to claim 19, further comprising:

a parallel linkage, wherein the rotary actuator is configured to drive the parallel linkage to change the distance between the first holder and the second holder to sandwich the object between the first holder and the second holder.

* * * * *